(12) United States Patent
Liu et al.

(10) Patent No.: US 12,543,216 B2
(45) Date of Patent: Feb. 3, 2026

(54) METHODS AND APPARATUS FOR CHANNEL OCCUPANCY TIME SHARING IN SIDELINK COMMUNICATION

(71) Applicant: QUALCOMM Incorporated, San Diego, CA (US)

(72) Inventors: Chih-Hao Liu, San Diego, CA (US); Xiaoxia Zhang, San Diego, CA (US); Jing Sun, San Diego, CA (US); Yisheng Xue, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 769 days.

(21) Appl. No.: 17/549,297

(22) Filed: Dec. 13, 2021

(65) Prior Publication Data

US 2023/0189335 A1   Jun. 15, 2023

(51) Int. Cl.
*H04W 74/0808* (2024.01)
*H04L 5/00* (2006.01)
*H04W 72/04* (2023.01)

(52) U.S. Cl.
CPC ....... *H04W 74/0808* (2013.01); *H04L 5/0048* (2013.01); *H04L 5/0055* (2013.01); *H04W 72/04* (2013.01)

(58) Field of Classification Search
CPC ......... H04W 74/0808; H04W 74/0816; H04W 74/0825; H04W 72/04; H04W 72/11; H04W 72/115; H04W 72/40; H04W 72/12; H04W 16/00; H04W 36/06; H04L 5/0048; H04L 5/005; H04L 5/0051; H04L 5/0055; H04L 5/00; H04L 1/1861; H04L 1/0001; H04B 7/024
See application file for complete search history.

(56) References Cited

U.S. PATENT DOCUMENTS

| | | | |
|---|---|---|---|
| 2020/0296796 A1* | 9/2020 | Uchiyama | H04W 72/02 |
| 2021/0212104 A1* | 7/2021 | Li | H04W 72/23 |
| 2022/0022279 A1* | 1/2022 | Kim | H04W 72/23 |
| 2022/0279581 A1* | 9/2022 | Baek | H04W 64/00 |
| 2024/0276549 A1* | 8/2024 | Freda | H04W 74/0875 |
| 2024/0292462 A1* | 8/2024 | Wang | H04W 74/0808 |

OTHER PUBLICATIONS

Freda et al. (US 2024/0276549 A1, U.S. Appl. No. 63/257,381, filed Oct. 19, 2021), "New Radio (NR) Vehicle to Vehicle (V2X)—Method For Scheduling Sidelink in Unlicensed Spectrum" (Year: 2021).*

* cited by examiner

*Primary Examiner* — Brian T Le
(74) *Attorney, Agent, or Firm* — ArentFox Schiff LLP

(57) ABSTRACT

Aspects of the present disclosure include methods, apparatuses, and computer readable media for receiving sidelink information from a first transmitting UE, receiving channel occupancy time (COT) system information (COT-SI) associated with a second transmitting UE, identifying one or more COT resources based on the COT-SI, and transmitting feedback information associated with the sidelink information via the one or more COT resources.

24 Claims, 9 Drawing Sheets

METHODS AND APPARATUS FOR CHANNEL OCCUPANCY TIME SHARING IN SIDELINK COMMUNICATION

TECHNICAL FIELD

Aspects of the present disclosure relate generally to wireless communications, and more particularly, to apparatuses and methods for channel occupancy time sharing in sidelink communication.

BACKGROUND

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

In a wireless communication network, a transmitting user equipment (UE) may transmit sidelink information to a receiving UE. In order to notify whether the receiving UE has successfully received and/or decoded the sidelink information, the receiving UE may transmit feedback information to the transmitting UE indicating acknowledgement (ACK) or negative acknowledgement (NACK) associated with the sidelink information. However, the receiving UE may be required to wait for the resources allocated by the transmitting UE to transmit the ACK/NACK information. In some instances, the wait time may be undesirable for certain sidelink communication. Therefore, improvements may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods by a receiving user equipment (UE) for receiving sidelink information from a first transmitting UE, receiving channel occupancy time (COT) system information (COT-SI) associated with a second transmitting UE, identifying one or more COT resources based on the COT-SI, and transmitting feedback information associated with the sidelink information via the one or more COT resources.

Other aspects of the present disclosure include a receiving user equipment (UE) having a memory comprising instructions, a transceiver, and one or more processors operatively coupled with the memory and the transceiver, the one or more processors configured to execute the instructions to receive sidelink information from a first transmitting UE, receive channel occupancy time (COT) system information (COT-SI) associated with a second transmitting UE, identify one or more COT resources based on the COT-SI, and transmit feedback information associated with the sidelink information via the one or more COT resources.

An aspect of the present disclosure includes a receiving user equipment (UE) including means for receiving sidelink information from a first transmitting UE, means for receiving channel occupancy time (COT) system information (COT-SI) associated with a second transmitting UE, means for identifying one or more COT resources based on the COT-SI, and means for transmitting feedback information associated with the sidelink information via the one or more COT resources.

Some aspects of the present disclosure include non-transitory computer readable media having instructions stored therein that, when executed by one or more processors of a receiving user equipment (UE), cause the one or more processors to receive sidelink information from a first transmitting UE, receive channel occupancy time (COT) system information (COT-SI) associated with a second transmitting UE, identify one or more COT resources based on the COT-SI, and transmit feedback information associated with the sidelink information via the one or more COT resources.

Aspects of the present disclosure include methods by a transmitting user equipment (UE) for transmitting sidelink information to a receiving UE, receiving channel occupancy time (COT) system information (COT-SI) associated with a neighbor transmitting UE, identifying one or more COT resources based on the COT-SI, and receiving feedback information associated with the sidelink information via the one or more COT resources.

Other aspects of the present disclosure include a transmitting user equipment (UE) having a memory comprising instructions, a transceiver, and one or more processors operatively coupled with the memory and the transceiver, the one or more processors configured to execute instructions to transmit sidelink information to a receiving UE, receive channel occupancy time (COT) system information (COT-SI) associated with a neighbor transmitting UE, identify one or more COT resources based on the COT-SI, and receive feedback information associated with the sidelink information via the one or more COT resources.

An aspect of the present disclosure includes a transmitting user equipment (UE) including means for transmitting sidelink information to a receiving UE, means for receiving channel occupancy time (COT) system information (COT-SI) associated with a neighbor transmitting UE, means for identifying one or more COT resources based on the COT-SI, and receiving feedback information associated with the sidelink information via the one or more COT resources.

Some aspects of the present disclosure include non-transitory computer readable media having instructions stored therein that, when executed by one or more processors of a transmitting user equipment (UE), cause the one or more processors to transmit sidelink information to a receiving UE, receive channel occupancy time (COT) system information (COT-SI) associated with a neighbor transmitting UE, identify one or more COT resources based on the COT-SI, and receive feedback information associated with the sidelink information via the one or more COT resources.

Aspects of the present disclosure include methods by a transmitting user equipment (UE) for transmitting sidelink information to a first UE, obtaining a plurality of resources for a channel occupancy time (COT) region, and transmitting COT system information (COT-SI) identifying one or more COT resources of the plurality of resources to at least a second UE for transmitting feedback information, wherein the feedback information is associated with sidelink information the second UE received from a transmitting UE different than the COT sharing UE.

Other aspects of the present disclosure include a transmitting user equipment (UE) having a memory comprising instructions, a transceiver, and one or more processors operatively coupled with the memory and the transceiver, the one or more processors configured to execute instructions to transmit sidelink information to a first UE, obtain a plurality of resources for a COT region, and transmit COT system information (COT-SI) identifying one or more COT resources of the plurality of resources to at least a second UE for transmitting feedback information, wherein the feedback information is associated with sidelink information the second UE received from a transmitting UE different than the COT sharing UE.

An aspect of the present disclosure includes a transmitting user equipment (UE) including means for transmitting sidelink information to a first UE, means for obtaining a plurality of resources for a COT region, and means for transmitting COT system information (COT-SI) identifying one or more COT resources of the plurality of resources to at least a second UE for transmitting feedback information, wherein the feedback information is associated with sidelink information the second UE received from a transmitting UE different than the COT sharing UE.

Some aspects of the present disclosure include non-transitory computer readable media having instructions stored therein that, when executed by one or more processors of a transmitting user equipment (UE), cause the one or more processors to transmit sidelink information to a first UE, obtain a plurality of resources for a COT region, and transmit COT system information (COT-SI) identifying one or more COT resources of the plurality of resources to at least a second UE for transmitting feedback information, wherein the feedback information is associated with sidelink information the second UE received from a transmitting UE different than the COT sharing UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
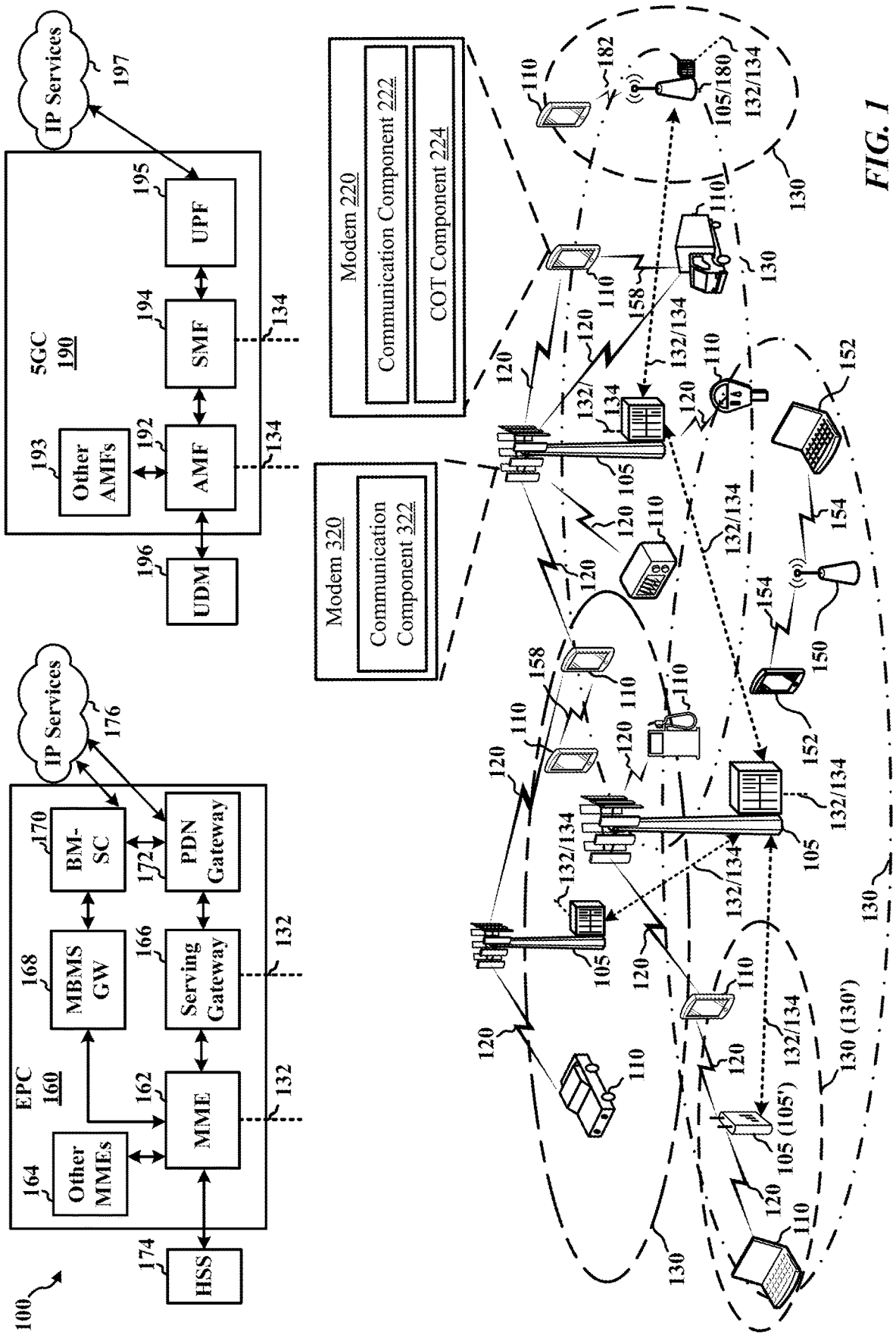
FIG. 1 is a diagram illustrating an example of a wireless communications system and an access network according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In some aspects, in a communication network (e.g., a new radio (NR) network), a base station (BS), such as a gNB, may transmit downlink (DL) information to a user equipment (UE). The BS to UE channel occupancy time (COT) sharing may allow the UE to share the COT of the BS for transmitting uplink (UL) information. In UL configuration grant (CG), the COT acquired by the UE may be shared with the BS to transmit and/or broadcast control and/or data information to the UE and/or other UEs. In some instances, the BS may share the COT by performing Cat-2 listen before talk (LBT) or no-LBT.

In some instances, sidelink (SL) communication may occur between a transmitting UE and a receiving UE. Mini-slots in sidelink control information (SCI)-1 or SCI-2 may carry sidelink feedback information (SLFI). In the slot resource pool, radio resource control (RRC) may configure multiple SLFI resources with mini-slot structures within a configured sub-channel. Each SLFI resource may be associated with a SLFI resource index. The SLFI may include ACK/NACK and/or channel state information (CSI).

Data scheduling SCI-2 may be enhanced to carry a slot offset (K1), a SLFI resource indication for the hybrid automatic repeat request (HARQ) feedback, and/or a CSI report (CSI trigger may be required).

In some instances, during SL UE-to-UE COT sharing, the receiving UE may only use the shared COT of the COT initiating UE (i.e., the transmitting UE) to transmit control, data, and/or broadcast information back to the COT initiating UE. However, ACK/NACK delay may be problematic for the SL communication if the ACK/NACK timeline does not fall in the COT of the physical sidelink shared channel (PSSCH) of the transmitting UE. For example, if the PSSCH transmission is at the end of the current COT, the receiving UE may be unable to respond in the current COT and be required to respond in the next COT. In some cases, the physical sidelink feedback channel (PSFCH) transmission may rely on the receiving UE to initiate a COT and/or the transmitting UE to initiate one or more COT for sharing with the receiving UE. However, both options may require the transmitting UE and/or the receiving UE to win the contention (over resources for the COT) against other SL nodes in the SL network.

In certain instances, ACK/NACK delay may occur in the context of group COT sharing. For example, the PSSCH transmitter (i.e., the transmitting UE) may share one or more COTs of other UEs if in a COT sharing group indicated in COT system information (COT-SI). However, the data receiver (i.e., the receiving UE) may not be in the same COT sharing group. Similarly, the receiver and the transmitter of sidelink information may be required to secure the respective COT to allow ACK/NACK transmission. SL nodes may allow flexible K1 (indicated in the scheduling SCI) for SLFI. However, in unlicensed operation, the n+K1 slot (where n is an integer) may not be in a COT of any SL node or any sharable COT region (e.g., remaining COT region). As such, the receiver may be unable to initiate a COT, and/or there is no available COT for other SL nodes.

An aspect of the present disclosure includes introducing COT sharing rules for control signaling that allows SL PSSCH, SCI, and/or CSI reference signals (RSs) receivers to respond with physical sidelink feedback channel (PSFCH) or SLFI by "piggybacking" on the COT of one or more other SL nodes that are not the transmitter of the SL PSSCH, SCI, and/or CSI-RS. SLFI scheduling with relative K1 may be associated with the starting slot of the COT.

In some aspects, the SL nodes not addressed by the COT initiator (i.e., a transmitting UE) may share the COT for transmitting PSFCH. The common PSFCH resources may be shared by multiple SL nodes (including ones not addressed by the COT initiator). The resource mapping may be determined by a hash function based on the transmitter identifier (ID) and/or the group ID. The PSCCH and/or PSSCH sub-channel resources may be dynamically used by the SL nodes.

In certain aspects, the SL nodes may exploit the COT of other UEs (by detecting the COT-SI) to transmit ACK/NACK via PSFCH. The SL nodes may not be limited to the nodes transmitting ACK/NACK to the COT initiating UE. For group COT sharing, the SL nodes may not be within the nodes of the COT sharing group. By detecting the COT-SI of other nodes, the SL nodes may upgrade the respective LBT to CAT-1 or CAT-2 within the COT sharing region, thereby reducing the channel access latency because multiple SL nodes may secure a COT for PSFCH. In some aspects, the sharing of COT may reduce ACK/NACK latency by not waiting for certain COT to end and relying on the responding node to initiate the COT and/or piggybacking on the COT of the target transmitting UE. With the PSFCH resource hashing, multiple receiving UEs may share the COT and transmit PSFCH in the overlapping PSFCH symbols with the same starting position and proper cyclic prefix (CP) padding (with frequency division multiplexing (FDM) or code division multiplexing (CDM)).

In some aspects, collision on PSFCH resources from different PSFCH transmitters or on PSFCH symbols for a LBT subband when the network does not allow SL PSFCH transmitters to transmit via FDM or CDM over the same symbol (i.e., only allowing time division multiplexing in the shared COT region). If there is a collision in the PSFCH resource, the transmitter addressed by the COT initiator may have the highest priority over other transmitters not addressed by the COT initiator. Based on decoding the SCI-2 of the COT initiator, transmitters not addressed by the COT initiator may determine the PSFCH resources to be used by the addressed transmitter via the source ID and/or the destination ID. The COT sharing transmitter (not addressed by the COT initiator) may "backoff" (give priority to) a PSFCH transmission if detecting a collision with the PSFCH transmission from the addressed transmitter to the COT initiator. For FDM/CDM PSFCH transmissions with the same starting position, a collision may occur if two or more PSFCH hashing IDs collide. For LBT subband TDM PSFCH transmission, there may be a single transmitter transmitting PSFCH in a LBT subband. The COT sharing PSFCH transmitter not addressed by the COT initiator may give priority to the PSFCH transmitter addressed by the COT initiator if transmitting in the same PSFCH symbols and/or the same LBT subband.

In some aspects, SLFI carrying CSI and/or ACK/NACK may be considered as control signals. In some cases, the SLFI may include PSCCH and/or short PSSCH (sPSSCH) information may be considered as control signals. Therefore, aspects of the present disclosure described above may be applicable to the SLFI. For SL aperiodic CSI (a-CSI), the CSI report may not be in the COT of the triggering transmitter. For ACK/NACK via SLFI, the indicated K1 may not be in the PSSCH of the COT of the transmitter. Aspects of the present disclosure includes a node sharing the COT sharing region of other SL nodes to transmit SLFI over PSCCH or PSSCH. For a-CSI, the CSI report may be transmitted in the SLFI k' slot after the CSI trigger, where k' is indicated in the SCI-2 triggering the CSI report. The SL receiver receiving the a-CSI trigger may check if n+K1' is within the COT of the target transmitter. If the indicated K1' for the SLFI is outside the COT of the target transmitter, the receiver may check if the SLFI resource is in the COT of other SL nodes. Other control information, such as ACK/NACK may also be implemented as described above.

Certain aspects of the present disclosure include relative K1/K1' for ACK/NACK for CSI transmitted via SLFI with respect to the COT of a COT initiator. The SCI may indicate the relative K1/K1' for out of COT scheduling. The transmitters sharing the COT but not addressed by the COT initiator may backoff on the SLFI transmission if the COT initiator schedules conflicting SLFI resources in COT. The COT initiator may be unaware of other nodes that have scheduled conflicting SLFI resources.

In some aspects, the receiver may detect the COT-SI from a node and transmit SLFI with the indicated K1/K1', but the original transmitting UE may not be able to detect the COT-SI and/or may miss the SLFI reception. In some instances, the transmitter and the COT sharer may be in the same cluster. Aspects of the present disclosure may include introducing a zone ID in the COT-SI to allow the receiver to choose the COT shared by the SL nodes "close" to the transmitter (e.g., in the same zone ID). If the COT sharing SL nodes and the transmitter are in the same zone, the transmitter may be able to detect the shared COT.

FIG. 1 is a diagram illustrating an example of a wireless communications system and an access network 100. The wireless communications system (also referred to as a wireless wide area network (WWAN)) includes at least one BS 105, UEs 110, an Evolved Packet Core (EPC) 160, and a 5G Core (5GC) 190. The BS 105 may include macro cells (high power cellular base station) and/or small cells (low power cellular base station). The macro cells include base stations. The small cells include femtocells, picocells, and microcells. In one implementation, the UE 110 may include a communication component 222 configured to communicate with the BS 105 via a cellular network, a Wi-Fi network, or other wireless and wired networks. In some aspects, the communication component 222 may transmit and/or receive sidelink information, COT-SI, and/or sidelink feedback information as described herein. The UE 110 may include a COT component 224 configured to identify COT resources as described herein. In some implementations, the communication component 222 and/or the COT component 224 may be implemented using hardware, software, or a combination of hardware and software. In some implementations, the BS 105 may include a communication component 322 configured to communicate with the UE 110. In some implementations, the communication component 322 may be implemented using hardware, software, or a combination of hardware and software.

A BS 105 configured for 4G Long-Term Evolution (LTE) (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 134. The backhaul links 132, 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
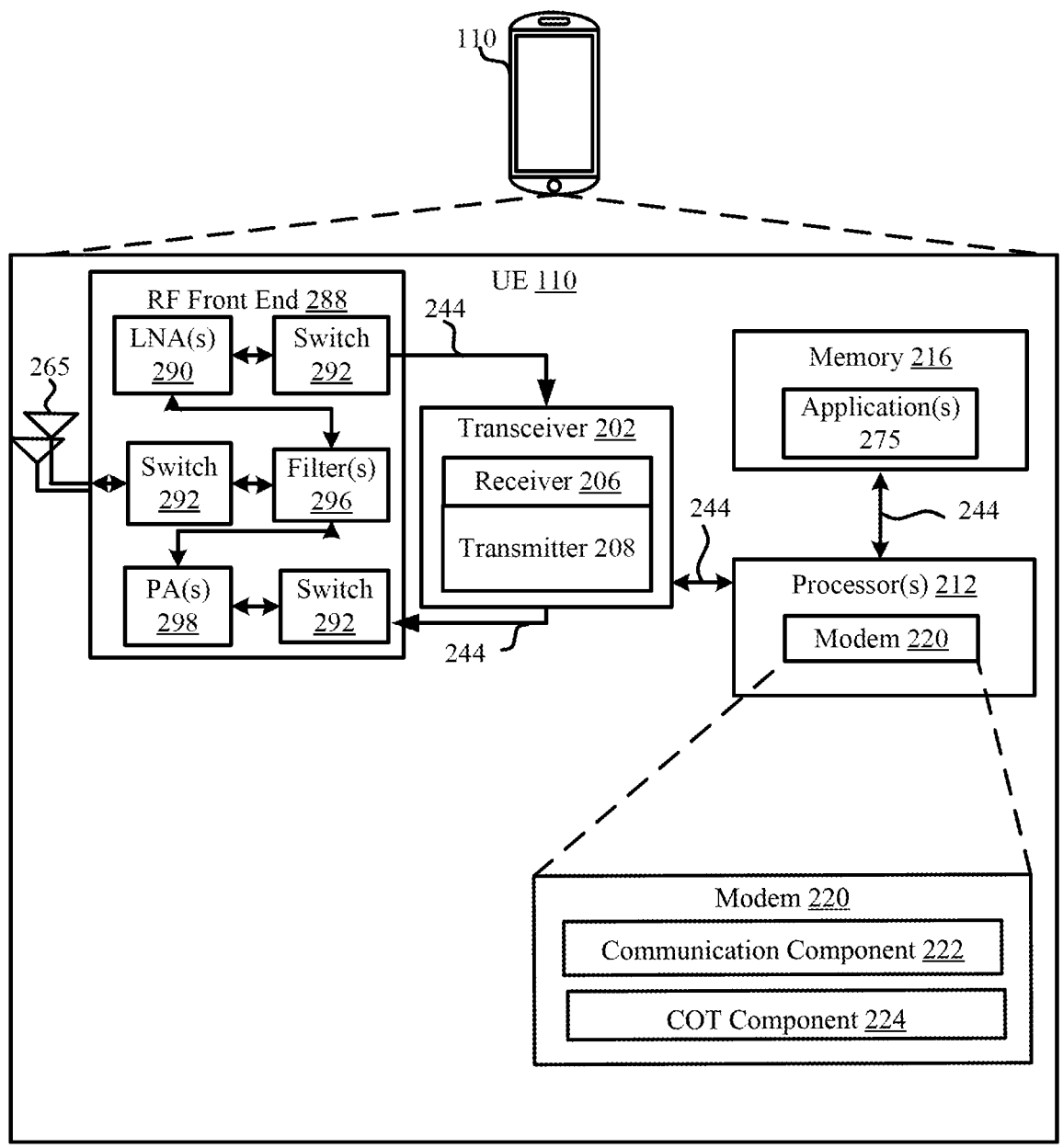
FIG. 2 is a schematic diagram of an example of a user equipment according to aspects of the present disclosure.

Referring to FIG. 2, one example of an implementation of the UE 110 may include a modem 220 having the communication component 222 and/or the COT component 224. In one implementation, the UE 110 may include a communication component 222 configured to communicate with the BS 105 via a cellular network, a Wi-Fi network, or other wireless and wired networks. In some aspects, the communication component 222 may transmit and/or receive sidelink information, COT-SI, and/or sidelink feedback information as described herein. The UE 110 may include a COT component 224 configured to identify COT resources as described herein.

In some implementations, the UE 110 may include a variety of components, including components such as one or more processors 212 and memory 216 and transceiver 202 in communication via one or more buses 244, which may operate in conjunction with the modem 220 and the communication component 222 to enable one or more of the functions described herein related to communicating with the BS 105. Further, the one or more processors 212, modem 220, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 220 that uses one or more modem processors. The various functions related to the communication component 222 and/or the COT component 224 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the processors 212. In other aspects, some of the features of the one or more processors 212 and/or the modem 220 associated with the communication component 222 may be performed by transceiver 202.

The memory 216 may be configured to store data used and/or local versions of application 275. Also, the memory 216 may be configured to store data used herein and/or local versions of the communication component 222 and/or the COT component 224, and/or one or more of the subcomponents being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222 and/or the COT component 224, and/or one or more of the subcomponents, and/or data associated therewith, when UE 110 is operating at least one processor 212 to execute the communication component 222 and/or the COT component 224, and/or one or more of the subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a RF receiving device. In an aspect, the receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
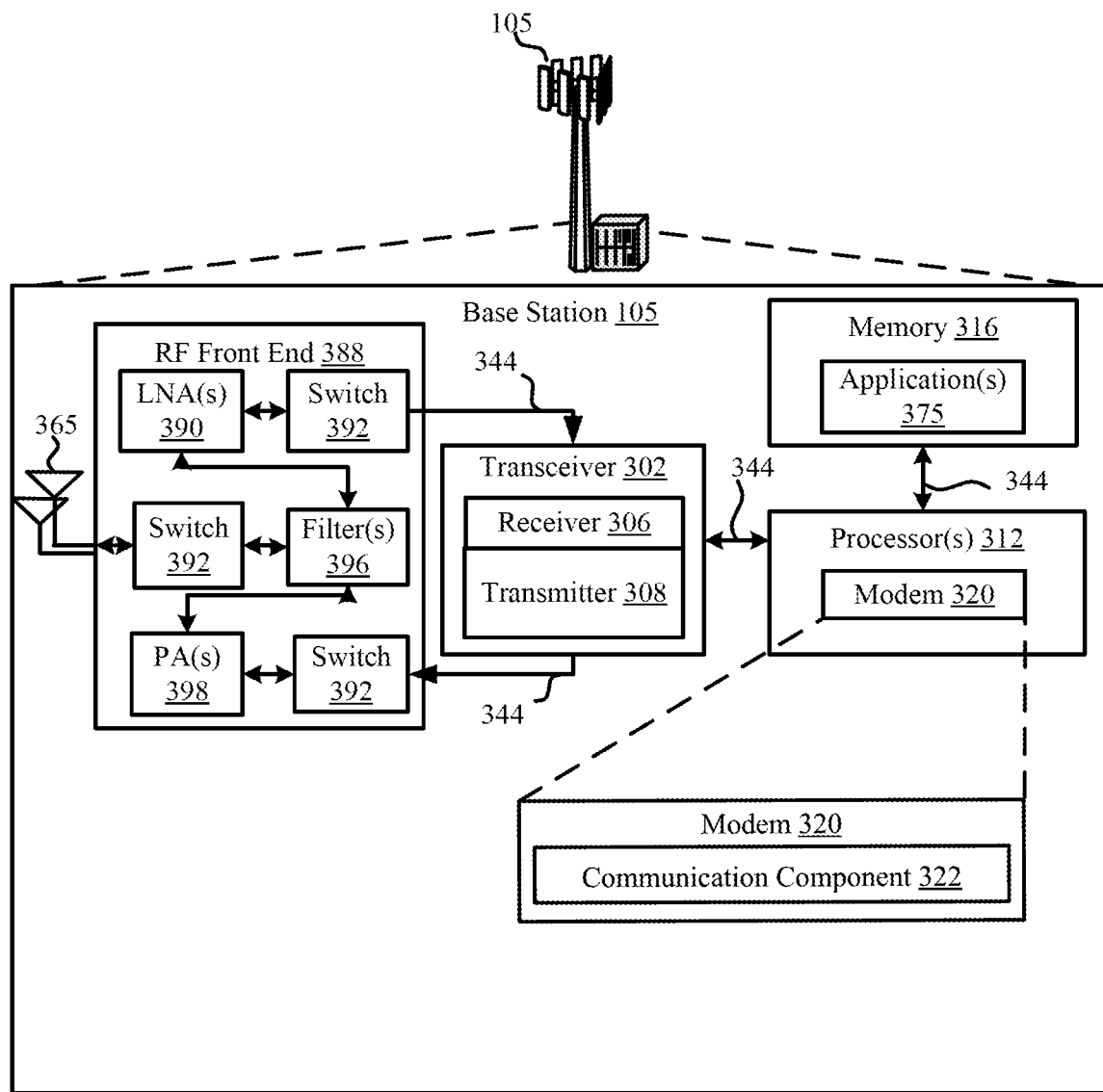
FIG. 3 is a schematic diagram of an example of a base station according to aspects of the present disclosure.

Referring to FIG. 3, one example of an implementation of the BS 105 may include a modem 320 having the communication component 322. In some implementations, the BS 105 may include a communication component 322 configured to communicate with the UE 110.

In some implementations, the BS 105 may include a variety of components, including components such as one or more processors 312 and memory 316 and transceiver 302 in communication via one or more buses 344, which may operate in conjunction with the modem 320 and the communication component 322 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies.

In an aspect, the one or more processors 312 may include the modem 320 that uses one or more modem processors. The various functions related to the communication component 322 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

The memory 316 may be configured to store data used herein and/or local versions of applications 375. Also, the memory 316 may be configured to store data used herein and/or local versions of the communication component 322, and/or one or more of the subcomponents being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322, and/or one or more of the subcomponents, and/or data associated therewith, when the BS 105 is operating at least one processor 312 to execute the communication component 322, and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, a RF receiving device. In an aspect, receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
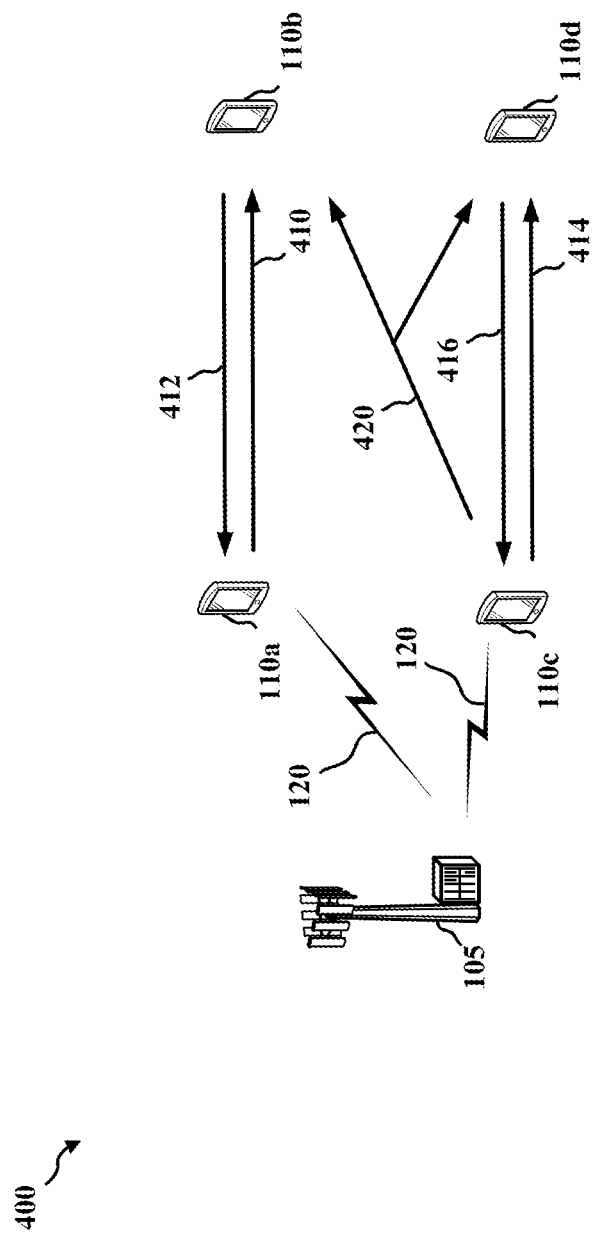
FIG. 4 illustrates an example of an environment for COT sharing according to aspects of the present disclosure.

FIG. 4 illustrates an example of an environment for COT sharing. An aspect of the present disclosure includes introducing COT sharing rules for control signaling that allows SL PSSCH, SCI, and/or CSI reference signals (RSs) receivers to respond with physical sidelink feedback channel (PSFCH) or SLFI by "piggybacking" on the COT of one or more other SL nodes that are not the transmitter of the SL PSSCH, SCI, and/or CSI-RS. SLFI scheduling with relative K1 may be associated with the starting slot of the COT.

In some aspects of the present disclosure, an environment 400 may include a BS 105. The environment 400 may include a first transmitting (TX) UE 110a and a first receiving (RX) UE 110b. The environment 400 may include a second TX UE 110c and a second RX UE 110d. The BS 105 may be configured to communicate with the first TX UE 110a and/or the second TX UE 110c via one or more communication links 120.

In some aspects of the present disclosure, the first TX UE 110a may transmit first SL information 410 to the first RX UE 110b. The second TX UE 110c may transmit second SL information 414 to the second RX UE 110d. The first SL information 410 and/or the second SL information 414 may include SL data (e.g., PSSCH), one or more CSI-RSs, SCI, and/or other SL data and/or control information. In response to the first SL information 410, the first RX UE 110b may transmit first feedback information 412 to the first TX UE 110a. In response to the second SL information 414, the second RX UE 110d may transmit second feedback information 416 to the second TX UE 110c. The first feedback information 412 and/or the second feedback information 416 may include CSI report, ACK/NACK, SLFI, or other control information.

Figure 5:
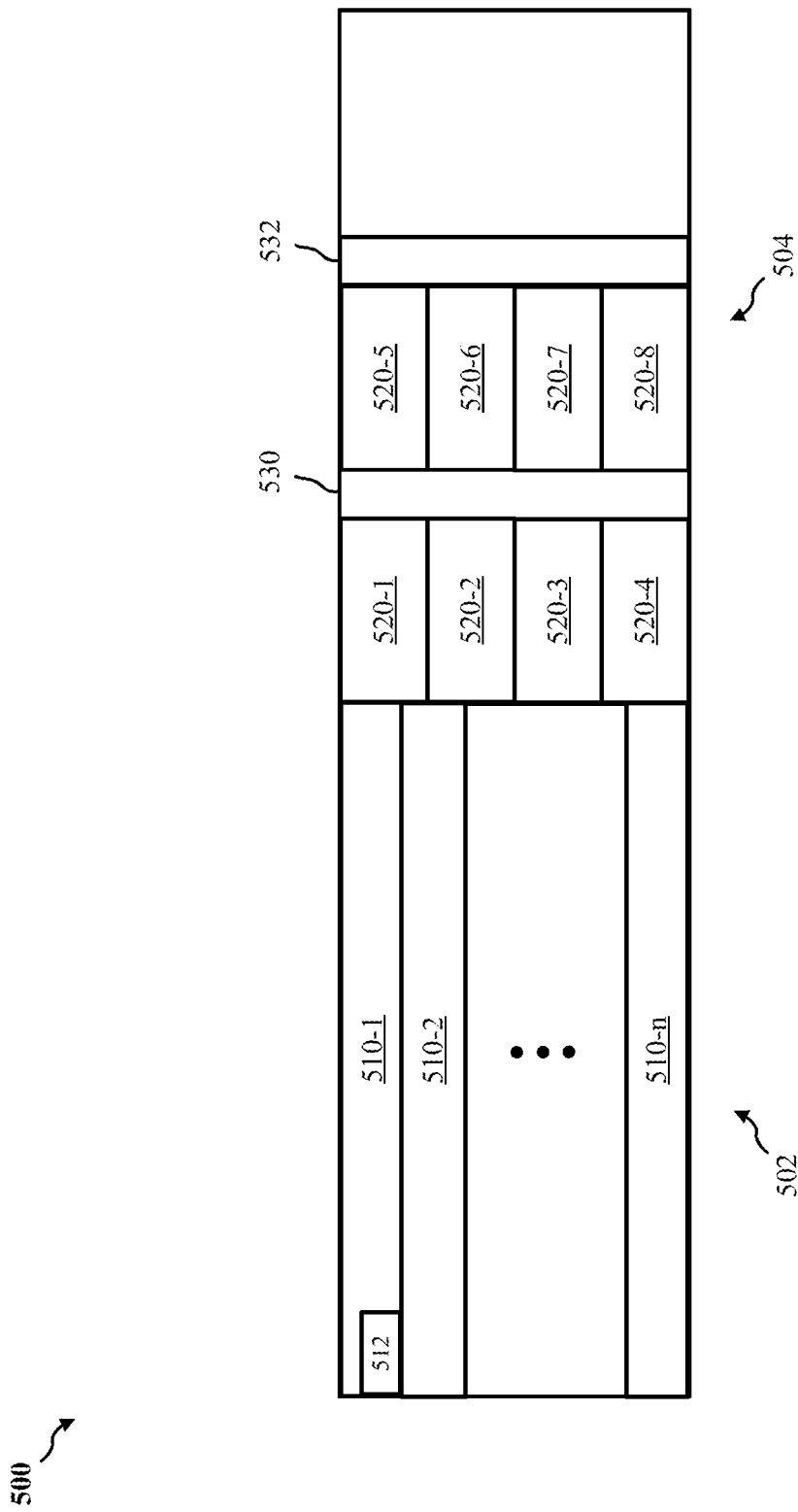
FIG. 5 illustrates an example of a COT initiated for sidelink communication according to aspects of the present disclosure.
Figure 6:
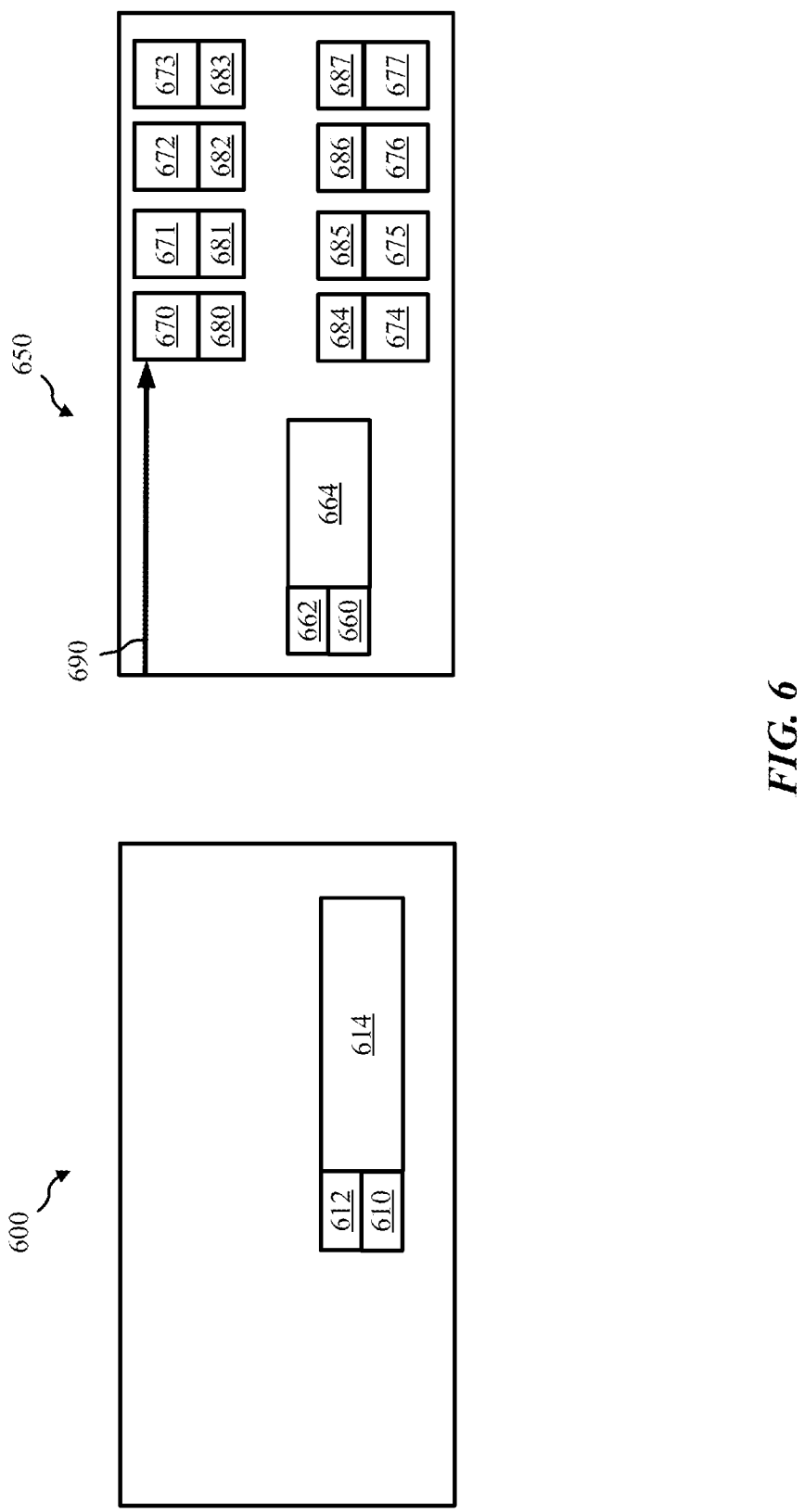
FIG. 6 illustrates an example of COT sharing for sidelink communication according to aspects of the present disclosure.

In one aspect of the present disclosure, the second TX UE 110c may request COT resources from the BS 105 for a COT (described in detail in FIGS. 5 and 6). The BS 105 may allocate COT resources for the COT for the second RX UE 110d to transmit the second feedback information 416. In response to obtaining the COT resources for the COT, the second TX UE 110c may transmit or broadcast COT-SI 420 associated with the COT to the first RX UE 110b and the second RX UE 110d. The first RX UE 110b and/or the second RX UE 110d may utilize the COT resources of the COT to transmit the first feedback information 412 and/or the second feedback information 416. For example, the first RX UE 110b may transmit the first feedback information 412 via a first COT resource and the second RX UE 110d may transmit the second feedback information 416 via a second COT resource.

FIG. 5 illustrates an example of a COT initiated for sidelink communication. In some aspects, the SL nodes not addressed by the COT initiator (i.e., a transmitting UE) may share the COT for transmitting PSFCH. The common PSFCH resources may be shared by multiple SL nodes (including ones not addressed by the COT initiator). The resource mapping may be determined by a hash function based on the transmitter identifier (ID) and/or the group ID. The PSCCH and/or PSSCH sub-channel resources may be dynamically used by the SL nodes.

In certain aspects, the SL nodes may exploit the COT of other UEs (by detecting the COT-SI) to transmit ACK/NACK via PSFCH. The SL nodes may not be limited to the nodes transmitting ACK/NACK to the COT initiating UE. For group COT sharing, the SL nodes may not be within the nodes of the COT sharing group. By detecting the COT-SI of other nodes, the SL nodes may upgrade the respective LBT to CAT 1/2 within the COT sharing region, thereby reducing the channel access latency because multiple SL nodes may secure a COT for PSFCH. In some aspects, the sharing of COT may reduce ACK/NACK latency by not waiting for certain COT to end and relying on the responding node to initiate the COT and/or piggybacking on the COT of the target transmitting UE. With the PSFCH resource hashing, multiple receiving UEs may share the COT and transmit PSFCH in the overlapping PSFCH symbols with the same starting position and proper CP padding (with frequency division multiplexing (FDM) or code division multiplexing (CDM)).

In some aspects, collision on PSFCH resources from different PSFCH transmitters or on PSFCH symbols for a LBT subband when the network does not allow SL PSFCH transmitters to transmit via FDM or CDM over the same symbol (i.e., only allowing time division multiplexing in the shared COT region). If there is a collision in the PSFCH resource, the transmitter addressed by the COT initiator may have the highest priority over other transmitters not addressed by the COT initiator. Based on decoding the SCI-2 of the COT initiator, transmitters not addressed by the COT initiator may determine the PSFCH resources to be used by the addressed transmitter via the source ID and/or the destination ID. The COT sharing transmitter (not addressed by the COT initiator) may "backoff" (give priority to) a PSFCH transmission if detecting a collision with the PSFCH transmission from the addressed transmitter to the COT initiator. For FDM/CDM PSFCH transmissions with the same starting position, a collision may occur if two or more PSFCH hashing IDs collide. For LBT subband TDM PSFCH transmission, there may be a single transmitter transmitting PSFCH in a LBT subband. The COT sharing PSFCH transmitter not addressed by the COT initiator may give priority to the PSFCH transmitter addressed by the COT initiator if transmitting in the same PSFCH symbols and/or the same LBT subband.

In one aspect of the present disclosure, a COT 500 may include a used COT sharing region 502 and a remaining COT sharing region 504. The used COT sharing region 502 may include subbands 510-1, 510-2 . . . 510-n, where n is a positive integer. The remaining COT sharing region 504 may include SL resources 520. The SL resources 520 may include PSCCH and/or PSSCH. The remaining COT sharing region 504 may include a first feedback resource 530 and a second feedback resource 532.

In some aspects, additionally referencing FIG. 4, the second TX UE 110c may initiate the COT 500. The second TX UE 110c may transmit first SL information to the second RX UE 110d via the subband 510-1. The second TX UE 110c may transmit SCI 512 to the second RX UE 110d. The second RX UE 110d may transmit second SL information (e.g., control information such as ACK/NACK and/or data information) via the SL resource 520-1. The second RX UE 110d may transmit first feedback information via at least a portion of the first feedback resource 530. In the current example, the second TX UE 110c may be referred to as the COT initiator.

In some aspects, the first TX UE 110a may transmit third SL information to the first RX UE 110b (via resources not shown in FIG. 5). In response, the first RX UE 110b may transmit second feedback information via at least a portion of the second feedback resource 532. Here, the first RX UE 110b may "piggyback" on the COT 500 initiated by the second TX UE 110c, regardless of whether the second TX UE 110c has transmitted to the first RX UE 110b.

In certain aspects of the present disclosure, the resource mapping may be determined via a hash function based on one or more of a transmitter ID (e.g., ID of the first TX UE 110a, the first RX UE 110b, the second TX UE 110c, or the second RX UE 110d) or a group ID associated with the COT initiator (i.e., the second TX UE 110c). The PSCCH/PSSCH sub-channel resources (i.e., the subbands 510-1, 510-2 . . . 510-n) may be dynamically used by the SL nodes (UEs shown or not shown). If there is a collision of resources (e.g., the first RX UE 110b and the second RX UE 110d both mapped to the same resource) the first RX UE 110b may "backoff" by yielding the collided resources to the second RX UE 110d because the second RX UE 110d is addressed by the second TX UE 110c, thus the second RX UE 110d has priority over other competing UEs.

FIG. 6 illustrates an example of COT sharing for sidelink communication. In some aspects, SLFI carrying CSI and/or ACK/NACK may be considered as control signals. In some cases, the SLFI may include PSCCH and/or short PSSCH (sPSSCH) information may be considered as control signals. Therefore, aspects of the present disclosure described above may be applicable to the SLFI. For SL aperiodic CSI (a-CSI), the CSI report may not be in the COT of the triggering transmitter. For ACK/NACK via SLFI, the indicated K1 may not be in the PSSCH of the COT of the transmitter. Aspects of the present disclosure include a node sharing the COT sharing region of other SL nodes to transmit SLFI over PSCCH or PSSCH. For a-CSI, the CSI report may be transmitted in the SLFI k' slot after the CSI trigger, where k' is indicated in the SCI-2 triggering the CSI report. The SL receiver receiving the a-CSI trigger may check if n+K1' is within the COT of the target transmitter. If the indicated K1' for the SLFI is outside the COT of the target transmitter, the receiver may check if the SLFI resource is in the COT of other SL nodes. Other control information, such as ACK/NACK may also be implemented as described above.

Certain aspects of the present disclosure include relative K1/K1' for ACK/NACK for CSI transmitted via SLFI with respect to the COT of a COT initiator. The SCI may indicate the relative K1/K1' for out of COT scheduling. The transmitters sharing the COT but not addressed by the COT initiator may backoff on the SLFI transmission if the COT initiator schedules conflicting SLFI resources in COT. The COT initiator may be unaware of other nodes that have scheduled conflicting SLFI resources.

In some aspects, the receiver may detect the COT-SI from a node and transmit SLFI with the indicated K1/K1', but the original transmitting UE may not be able to detect the COT-SI and/or may miss the SLFI reception. To avoid the problem above, the transmitter and the COT sharer may be in the same cluster. Aspects of the present disclosure may include introducing a zone ID in the COT-SI to allow the receiver to choose the COT shared by the SL nodes "close" to the transmitter (e.g., in the same zone ID). If the COT sharing SL nodes and the transmitter are in the same zone, the transmitter may be able to detect the shared COT.

In some aspects of the present disclosure and additionally referencing FIG. 4, the first TX ULE 110a may initiate the first COT 600. The first TX UE 110a may transmit first SCI-1 610 and first SCI-2 612 to the first RX UE 110b via resources in the first COT 600. The first TX UE 110a may transmit first information 614 to the first RX ULE 110b via resources in the first COT 600. For example, the first information 614 may include sidelink data information transmitted via one or more PSSCHs. Alternatively or additionally, the first information 614 may include CSI triggers/CSI-RSs or other control information transmitted via one or more PSCCHs. The first RX UE 110b may be configured to respond with feedback information associated with the first information 614, such ACK/NACK, CSI report, or other information in response to the first information 614. However, the first RX UE 110b may be unable to respond with the feedback information within the first COT 600 because the first SCI-1 610, the first SCI-2 612, and/or the first information 614 are transmitted via resources toward the "end" of the first COT 600 (e.g., last slot, second to last slot, etc.).

In some aspects of the present disclosure, the second TX UE 110c may initiate the second COT 650. The second TX UE 110c may transmit second SCI-1 660 and second SCI-2 662 to the second RX UE 110d via resources in the second COT 650. The second TX UE 110c may transmit second information 664 to the second RX UE 110d via resources in the second COT 600. The second TX UE 110c may transmit or broadcast the COT-SI 420 associated with the second COT 650 to the first RX UE 110b and/or the second RX UE 110d. The COT-SI 420 may include indications of resources in the second COT 650. For example, the COT-SI 420 may include one or more of resource indices of PSFCH data resources 670, 671, 672, 673, 674, 675, 676, 677, resource indices of PSFCH control resources 680, 681, 682, 683, 684, 685, 686, 687, an offset 690 associated with the position PSFCH data resources 670-677 and/or PSFCH control resources 680-687. The offset 690 may indicate the slot position of the PSFCH data resources 670-677 and/or PSFCH control resources 680-687 from a first slot of the second COT 650.

In some implementations, the first RX UE 110b may utilizes the resources of the second COT 650 to transmit the feedback information associated with the first information 614. For example, the first RX UE 110b may transmit SLFI carrying the CSI report and/or ACK/NACK to the first TX UT 110a via resources in the second COT 650, such as the PSFCH data resources 671 and/or the PSFCH control resources 681. The first RX UE 110b may select the resources based on the offset 690 to identify the slot carrying the PSFCH data resources 670, 671, 672, 673, 674, 675, 676, 677 and the PSFCH control resources 680, 681, 682, 683, 684, 685, 686, 687, the resource indices of PSFCH data resources 670, 671, 672, 673, 674, 675, 676, 677, and/or the resource indices of PSFCH control resources 680, 681, 682, 683, 684, 685, 686, 687. The first TX UE 110a may monitor the second COT 650 to receive the SLFI.

In some aspects of the present disclosure, the first RX UE 110b may transmit the feedback information to the first TX UT 110a via the PSFCH data resources 671 and/or the PSFCH control resources 681 if there is no collision. If a collision occurs, such as a collision with the second RX UE 110d attempting to transmit using the same resources, the first RX UE 110b may "backoff" to let the second RX UE 110d utilize the conflicted resources because the second RX UE 110d may be addressed by the COT initiator, i.e., the second TX UE 110c.

In some aspects, the COT-SI 420 may include a zone ID associated with a geographic zone of the second TX UE 110c. When selecting the second COT 650, the first RX UE 110b may first determine that the second TX UE 110c is in the same zone as the first TX UE 110a. As a result, the first TX ULE 110a may be more likely to detect the second COT 650 than if the first TX UE 110a and the second TX UE 110b are in different zones.

Figure 7:
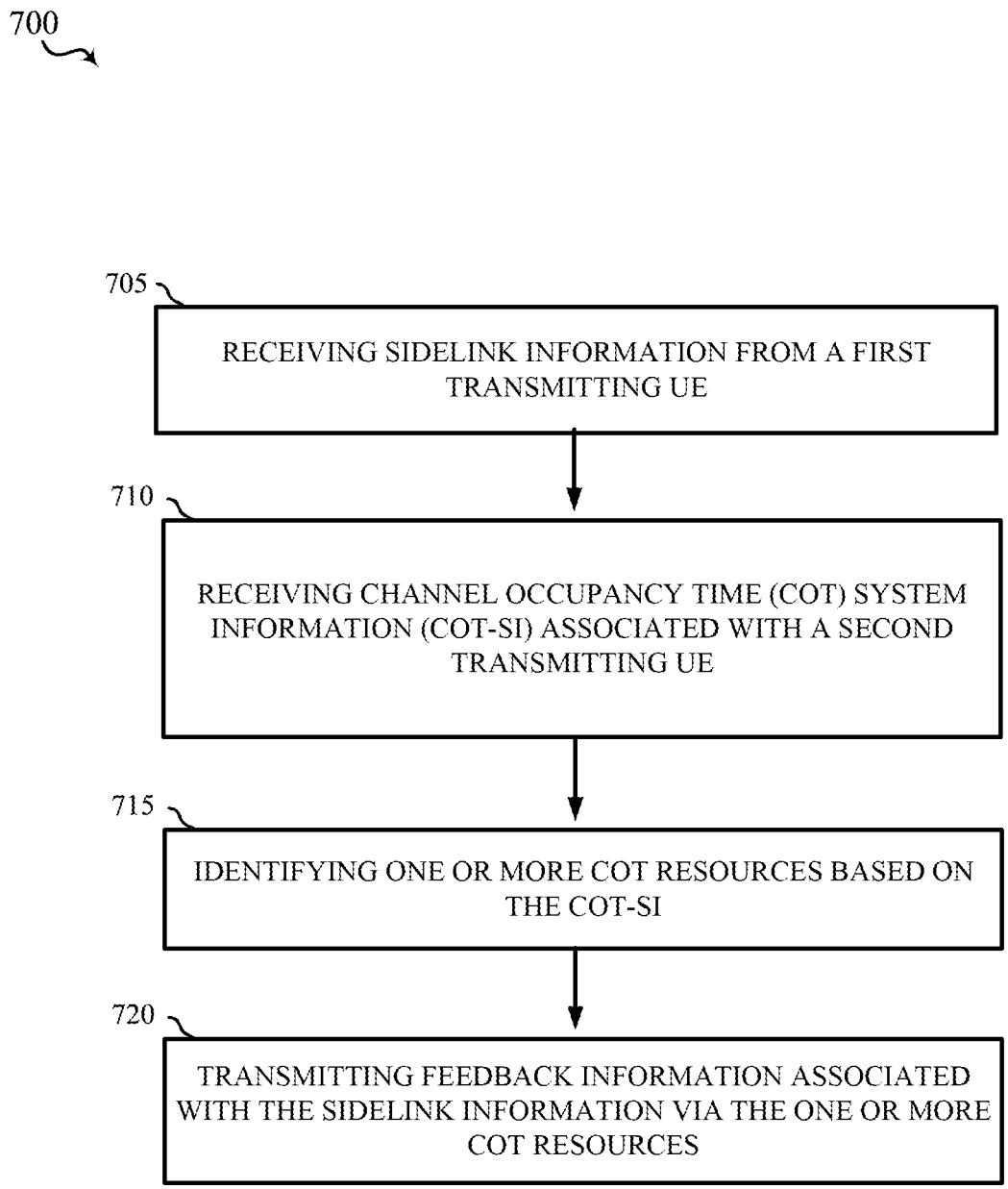
FIG. 7 illustrates an example of a first method of COT sharing for sidelink communication according to aspects of the present disclosure.

FIG. 7 illustrates an example of a method of COT sharing for sidelink communication. For example, a method 700 may be performed by the one or more of the processor 212, the memory 216, the applications 275, the modem 220, the transceiver 202, the receiver 206, the transmitter 208, the RF front end 288, the communication component 222 and/or the COT component 224, and/or one or more other components of the first RX UE 110a in the wireless communication network 100.

At block 705, the method 700 may receive sidelink information from a first transmitting UE. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive sidelink information from a first transmitting UE as described above. The RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving sidelink information from a first transmitting UE.

At block 710, the method 700 may receive channel occupancy time (COT) system information (COT-SI) associated with a second transmitting UE. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive channel occupancy time (COT) system information (COT-SI) associated with a second transmitting UE as described above. The RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving channel occupancy time (COT) system information (COT-SI) associated with a second transmitting UE.

At block 715, the method 700 may identify one or more COT resources based on the COT-SI. For example, the COT component 224, the processor 212, the memory 216, the modem 220, and/or the applications 275 of the UE 110 may identify one or more COT resources based on the COT-SI.

In certain implementations, the COT component 224, the processor 212, the memory 216, the modem 220, and/or the applications 275 may be configured to and/or may define means for identifying one or more COT resources based on the COT-SI.

At block 720, the method 700 may transmit feedback information associated with the sidelink information via the one or more COT resources. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may transmit feedback information associated with the sidelink information via the one or more COT resources as described above. The communication component 222 may send the digital signals to the transceiver 202 or the transmitter 208. The transceiver 202 or the transmitter 208 may convert the digital signals to electrical signals and send to the RF front end 288. The RF front end 288 may filter and/or amplify the electrical signals. The RF front end 288 may send the electrical signals as electro-magnetic signals via the one or more antennas 265.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for transmitting feedback information associated with the sidelink information via the one or more COT resources.

Alternatively or additionally, the method 700 may further include the method above, wherein identifying the one or more COT resources comprises obtaining a transmitter identifier (ID) associated with the first transmitting UE and a group ID associated with the first transmitting UE, applying a hash function to at least one of the transmitter ID or the group ID to generate a result value, and identifying the one or more COT resources based on the result value.

Alternatively or additionally, the method 700 may further include any of the methods above, wherein transmitting the feedback information comprises transmitting the feedback information via a physical sidelink feedback channel (PSFCH).

Alternatively or additionally, the method 700 may further include any of the methods above, further comprising receiving sidelink control information (SCI), and wherein the feedback information includes sidelink feedback information (SLFI) including at least one of an acknowledgement (ACK) associated with the sidelink information, a negative acknowledgement (NACK) associated with the sidelink information, or a channel state information (CSI) report.

Alternatively or additionally, the method 700 may further include any of the methods above, further comprising receiving one or more CSI reference signals (CSI RSs), wherein the SCI includes a request for the CSI report associated with the one or more CSI RSs.

Alternatively or additionally, the method 700 may further include any of the methods above, wherein the SCI includes an offset value indicating a number of resources between sidelink resources allocated for the sidelink information and a portion of the one or more COT resources allocated for the SLFI, and a resource index indicating a position of the SLFI in the one or more COT resources.

Alternatively or additionally, the method 700 may further include any of the methods above, further comprising receiving at least one of an offset value indicating a number of resources between sidelink resources allocated for the sidelink information and a portion of the one or more COT resources allocated for the SLFI or a resource index indicating a position of the SLFI in the one or more COT resources, and wherein the SLFI includes one of the ACK or the NACK.

Alternatively or additionally, the method 700 may further include any of the methods above, further comprising identifying a COT region associated with the second transmitting UE based on the COT-SI, wherein the COT region includes the one or more COT resources, and receiving at least one of a relative offset value indicating a number of resources between a first resource in the COT region or a last resource in the COT region and the one or more COT resources.

Alternatively or additionally, the method 700 may further include any of the methods above, further comprising identifying a first zone identifier (ID) associated with the first transmitting UE, selecting the second transmitting UE based on a second zone ID of the second transmitting UE being identical to the first zone ID of the first transmitting UE, and wherein transmitting the feedback information comprises transmitting the SLFI after selecting the second transmitting UE for being in a same zone as the first transmitting UE.

The methods above may be performed by the one or more of the processor 212, the memory 216, the applications 275, the modem 220, the transceiver 202, the receiver 206, the transmitter 208, the RF front end 288, the communication component 222 and/or the COT component 224, and/or one or more other components of the first RX UE 110*a* in the wireless communication network 100.

Figure 8:
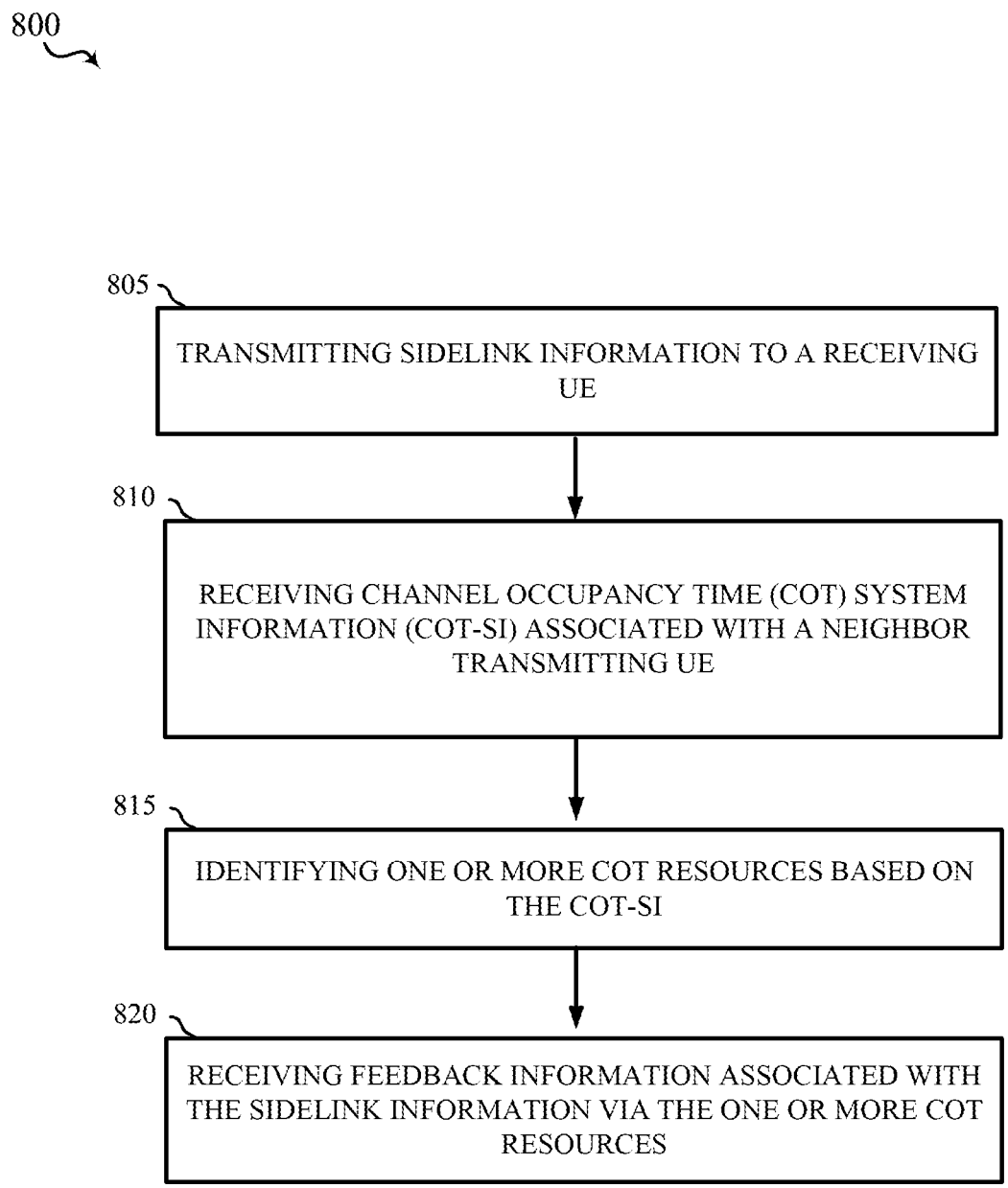
FIG. 8 illustrates an example of a second method of COT sharing for sidelink communication.

FIG. 8 illustrates an example of a method of COT sharing for sidelink communication. For example, a method 800 may be performed by the one or more of the processor 212, the memory 216, the applications 275, the modem 220, the transceiver 202, the receiver 206, the transmitter 208, the RF front end 288, the communication component 222 and/or the COT component 224, and/or one or more other components of the first TX UE 110*a* in the wireless communication network 100.

At block 805, the method 800 may transmit sidelink information to a receiving UE. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may transmit sidelink information to a receiving UE as described above. The communication component 222 may send the digital signals to the transceiver 202 or the transmitter 208. The transceiver 202 or the transmitter 208 may convert the digital signals to electrical signals and send to the RF front end 288. The RF front end 288 may filter and/or amplify the electrical signals. The RF front end 288 may send the electrical signals as electro-magnetic signals via the one or more antennas 265.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for transmitting sidelink information to a receiving UE.

At block 810, the method 800 may receive channel occupancy time (COT) system information (COT-SI) associated with a neighbor transmitting UE. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive channel occupancy time (COT) system information (COT-SI) associated with a neighbor transmitting UE as described above. The RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving channel occupancy time (COT) system information (COT-SI) associated with a neighbor transmitting UE.

At block 815, the method 800 may identify one or more COT resources based on the COT-SI. For example, the COT component 224, the processor 212, the memory 216, the modem 220, and/or the applications 275 of the UE 110 may identify one or more COT resources based on the COT-SI.

In certain implementations, the COT component 224, the processor 212, the memory 216, the modem 220, and/or the applications 275 may be configured to and/or may define means for identifying one or more COT resources based on the COT-SI.

At block 820, the method 800 may receive feedback information associated with the sidelink information via the one or more COT resources. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive feedback information associated with the sidelink information via the one or more COT resources as described above. The RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving feedback information associated with the sidelink information via the one or more COT resources.

Alternatively or additionally, the method 800 may further include the method above, wherein receiving the feedback information comprises receiving the feedback information via a physical sidelink feedback channel (PSFCH).

Alternatively or additionally, the method 800 may further include any of the methods above, wherein transmitting the feedback information comprises transmitting the feedback information via a physical sidelink feedback channel (PSFCH).

Alternatively or additionally, the method 800 may further include any of the methods above, further comprising transmitting sidelink control information (SCI) and wherein the feedback information includes sidelink feedback information (SLFI) including at least one of an acknowledgement (ACK) associated with the sidelink information, a negative acknowledgement (NACK) associated with the sidelink information, or a channel state information (CSI) report.

Alternatively or additionally, the method 800 may further include any of the methods above, further comprising transmitting one or more CSI reference signals (CSI RSs), wherein the SCI includes a request for the CSI report associated with the one or more CSI RSs.

Alternatively or additionally, the method 800 may further include any of the methods above, wherein the SCI includes an offset value indicating a number of resources between sidelink resources allocated for the sidelink information and a portion of the one or more COT resources allocated for the SLFI, and a resource index indicating a position of the SLFI in the one or more COT resources.

Alternatively or additionally, the method 800 may further include any of the methods above, further comprising transmitting at least one of an offset value indicating a number of resources between sidelink resources allocated for the sidelink information and a portion of the one or more COT resources allocated for the SLFI or a resource index indicating a position of the SLFI in the one or more COT resources, and wherein the SLFI includes one of the ACK or the NACK.

Alternatively or additionally, the method 800 may further include any of the methods above, further comprising identifying a COT region associated with the neighbor transmitting UE based on the COT-SI, wherein the COT region includes the one or more COT resources, and transmitting at least one of a relative offset value indicating a number of resources between a first resource in the COT region or a last resource in the COT region and the one or more COT resources.

The methods above may be performed by the one or more of the processor 212, the memory 216, the applications 275, the modem 220, the transceiver 202, the receiver 206, the transmitter 208, the RF front end 288, the communication component 222 and/or the COT component 224, and/or one or more other components of the first TX UE 110a in the wireless communication network 100.

Figure 9:
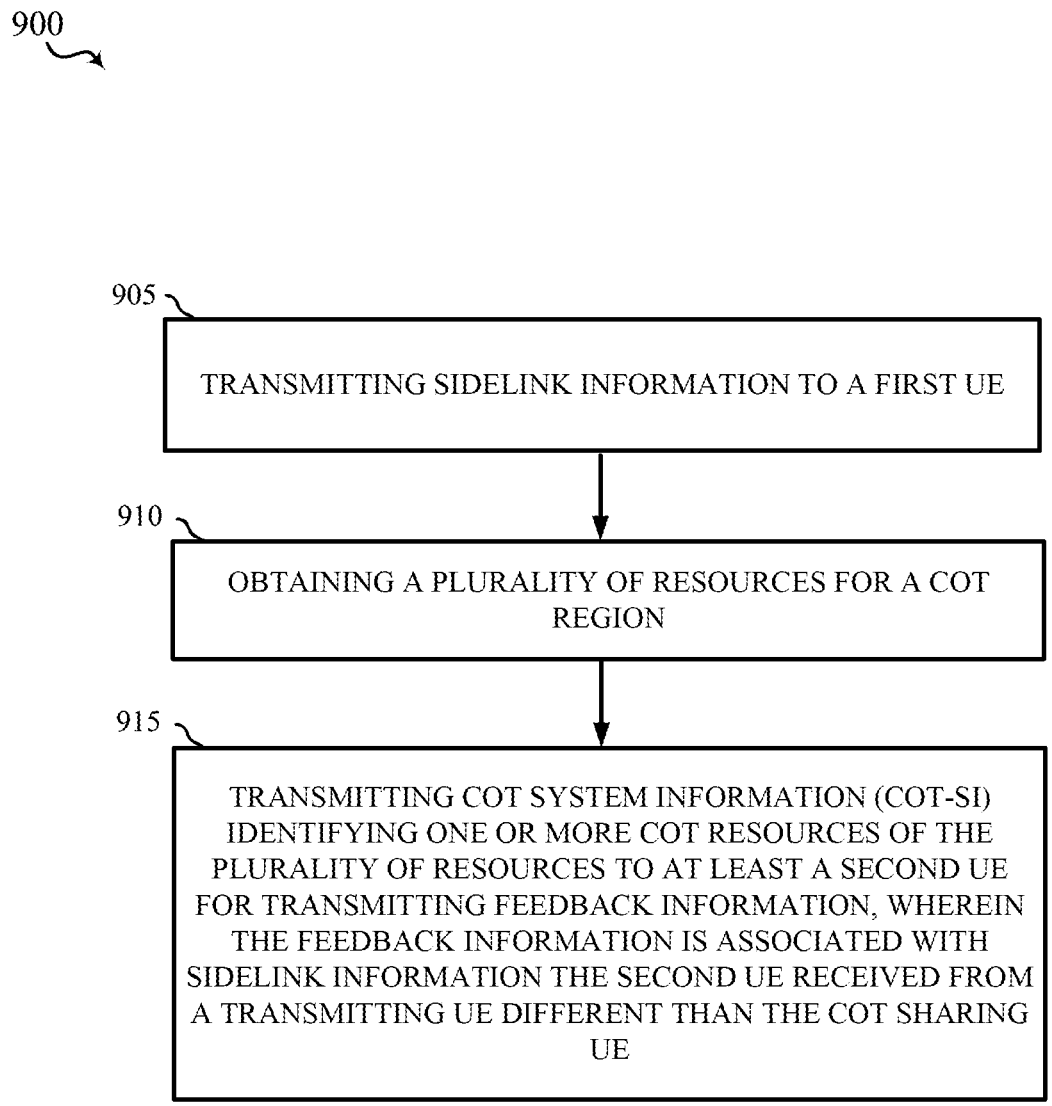
FIG. 9 illustrates an example of a third method of COT sharing for sidelink communication.

FIG. 9 illustrates an example of a method of COT sharing for sidelink communication. For example, a method 900 may be performed by the one or more of the processor 212, the memory 216, the applications 275, the modem 220, the transceiver 202, the receiver 206, the transmitter 208, the RF front end 288, the communication component 222 and/or the COT component 224, and/or one or more other components of the second TX UE 110c in the wireless communication network 100.

At block 905, the method 900 may transmit sidelink information to a first UE. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may transmit sidelink information to a first UE as described above. The communication component 222 may send the digital signals to the transceiver 202 or the transmitter 208. The transceiver 202 or the transmitter 208 may convert the digital signals to electrical signals and send to the RF front end 288. The RF front end 288 may filter and/or amplify the electrical signals. The RF front end 288 may send the electrical signals as electro-magnetic signals via the one or more antennas 265.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for transmitting sidelink information to a first UE.

At block 910, the method 900 may obtain a plurality of resources for a COT region. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may obtain a plurality of resources for a COT region as described above.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for obtaining a plurality of resources for a COT region.

At block 915, the method 900 may transmit COT system information (COT-SI) identifying one or more COT resources of the plurality of resources to at least a second UE for transmitting feedback information, wherein the feedback information is associated with sidelink information the second UE received from a transmitting UE different than the COT sharing UE. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may transmit COT system information (COT-SI) identifying one or more COT resources of the plurality of resources to at least a second UE for transmitting feedback information, wherein the feedback information is associated with sidelink information the second UE received from a transmitting UE different than the COT sharing UE as described above. The transceiver 202 or the transmitter 208 may convert the digital signals to electrical signals and send to the RF front end 288. The RF front end 288 may filter and/or amplify the electrical signals. The RF front end 288 may send the electrical signals as electro-magnetic signals via the one or more antennas 265.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for transmitting COT system information (COT-SI) identifying one or more COT resources of the plurality of resources to at least a second UE for transmitting feedback information, wherein the feedback information is associated with sidelink information the second UE received from a transmitting UE different than the COT sharing UE.

Alternatively or additionally, the method 900 may further include the method above, wherein receiving the feedback information comprises receiving the feedback information via a physical sidelink feedback channel (PSFCH).

Alternatively or additionally, the method 900 may further include any of the methods above, further comprising obtaining a transmitter identifier (ID) associated with the transmitting UE and a group ID associated with the first transmitting UE, applying a hash function to at least one of the transmitter ID or the group ID to generate a result value, and identifying the one or more COT resources based on the result value.

Alternatively or additionally, the method 900 may further include any of the methods above, further comprising transmitting allocating the one or more COT resources to the second UE for transmitting the feedback information.

Alternatively or additionally, the method 900 may further include any of the methods above, further comprising receiving a request for a set of COT resources of the plurality of COT resources from the first UE, wherein at least a portion of the set of COT resources overlaps with at least a portion of the one or more COT resources and allocating the set of COT resources to the first UE.

The methods above may be performed by the one or more of the processor 212, the memory 216, the applications 275, the modem 220, the transceiver 202, the receiver 206, the transmitter 208, the RF front end 288, the communication component 222 and/or the COT component 224, and/or one or more other components of the second TX UE 110c in the wireless communication network 100.

Additional Implementations

Aspects of the present disclosure include methods by a user equipment (UE) for receiving sidelink information from a first transmitting UE, receiving channel occupancy time (COT) system information (COT-SI) associated with a second transmitting UE, identifying one or more COT resources based on the COT-SI, and transmitting feedback information associated with the sidelink information via the one or more COT resources.

The method above, wherein identifying the one or more COT resources comprises obtaining a transmitter identifier (ID) associated with the first transmitting UE and a group ID associated with the first transmitting UE, applying a hash function to at least one of the transmitter ID or the group ID to generate a result value, and identifying the one or more COT resources based on the result value.

Any of the methods above, wherein transmitting the feedback information comprises transmitting the feedback information via a physical sidelink feedback channel (PSFCH).

Any of the methods above, further comprising receiving sidelink control information (SCI), and wherein the feedback information includes sidelink feedback information (SLFI) including at least one of an acknowledgement (ACK) associated with the sidelink information, a negative acknowledgement (NACK) associated with the sidelink information, or a channel state information (CSI) report.

Any of the methods above, further comprising receiving one or more CSI reference signals (CSI RSs), wherein the SCI includes a request for the CSI report associated with the one or more CSI RSs.

Any of the methods above, wherein the SCI includes an offset value indicating a number of resources between sidelink resources allocated for the sidelink information and a portion of the one or more COT resources allocated for the SLFI, and a resource index indicating a position of the SLFI in the one or more COT resources.

Any of the methods above, further comprising receiving at least one of an offset value indicating a number of resources between sidelink resources allocated for the sidelink information and a portion of the one or more COT resources allocated for the SLFI or a resource index indicating a position of the SLFI in the one or more COT resources, and wherein the SLFI includes one of the ACK or the NACK.

Any of the methods above, further comprising identifying a COT region associated with the second transmitting UE based on the COT-SI, wherein the COT region includes the one or more COT resources, and receiving at least one of a relative offset value indicating a number of resources between a first resource in the COT region or a last resource in the COT region and the one or more COT resources.

Any of the methods above, further comprising identifying a first zone identifier (ID) associated with the first transmitting UE, selecting the second transmitting UE based on a second zone ID of the second transmitting UE being identical to the first zone ID of the first transmitting UE, and wherein transmitting the feedback information comprises transmitting the SLFI after selecting the second transmitting UE for being in a same zone as the first transmitting UE.

Other aspects of the present disclosure include a user equipment (UE) having a memory comprising instructions, a transceiver, and one or more processors operatively coupled with the memory and the transceiver, the one or more processors configured to execute instructions in the memory to receive sidelink information from a first transmitting UE, receive channel occupancy time (COT) system information (COT-SI) associated with a second transmitting UE, identify one or more COT resources based on the COT-SI, and transmit feedback information associated with the sidelink information via the one or more COT resources.

Any of the UEs above, wherein identifying the one or more COT resources comprises obtaining a transmitter identifier (ID) associated with the first transmitting UE and a group ID associated with the first transmitting UE, applying a hash function to at least one of the transmitter ID or the group ID to generate a result value, and identifying the one or more COT resources based on the result value.

Any of the UEs above, wherein transmitting the feedback information comprises transmitting the feedback information via a physical sidelink feedback channel (PSFCH).

Any of the UEs above, wherein the one or more processors are further configured to receive sidelink control information (SCI), and wherein the feedback information includes sidelink feedback information (SLFI) including at least one of an acknowledgement (ACK) associated with the sidelink information, a negative acknowledgement (NACK) associated with the sidelink information, or a channel state information (CSI) report.

Any of the UEs above, wherein the one or more processors are further configured to receive one or more CSI reference signals (CSI RSs), wherein the SCI includes a request for the CSI report associated with the one or more CSI RSs.

Any of the UEs above, wherein the SCI includes an offset value indicating a number of resources between sidelink resources allocated for the sidelink information and a portion of the one or more COT resources allocated for the SLFI, and a resource index indicating a position of the SLFI in the one or more COT resources.

Any of the UEs above, wherein the one or more processors are further configured to receive at least one of an offset value indicating a number of resources between sidelink resources allocated for the sidelink information and a portion of the one or more COT resources allocated for the SLFI or a resource index indicating a position of the SLFI in the one or more COT resources, and wherein the SLFI includes one of the ACK or the NACK.

Any of the UEs above, wherein the one or more processors are further configured to identify a COT region associated with the second transmitting UE based on the COT-SI, wherein the COT region includes the one or more COT resources, and receive at least one of a relative offset value indicating a number of resources between a first resource in the COT region or a last resource in the COT region and the one or more COT resources.

Any of the UEs above, wherein the one or more processors are further configured to identify a first zone identifier (ID) associated with the first transmitting UE, select the second transmitting UE based on a second zone ID of the second transmitting UE being identical to the first zone ID of the first transmitting UE, and wherein transmitting the feedback information comprises transmitting the SLFI after selecting the second transmitting UE for being in a same zone as the first transmitting UE.

An aspect of the present disclosure includes a user equipment (UE) including means for receiving sidelink information from a first transmitting UE, means for receiving channel occupancy time (COT) system information (COT-SI) associated with a second transmitting UE, means for identifying one or more COT resources based on the COT-SI, and means for transmitting feedback information associated with the sidelink information via the one or more COT resources.

Any of the UEs above, wherein means for identifying the one or more COT resources comprises obtaining a transmitter identifier (ID) associated with the first transmitting UE and a group ID associated with the first transmitting UE, applying a hash function to at least one of the transmitter ID or the group ID to generate a result value, and identifying the one or more COT resources based on the result value.

Any of the UEs above, wherein means for transmitting the feedback information comprises means for transmitting the feedback information via a physical sidelink feedback channel (PSFCH).

Any of the UEs above, further comprising means for receiving sidelink control information (SCI), and wherein the feedback information includes sidelink feedback information (SLFI) including at least one of an acknowledgement (ACK) associated with the sidelink information, a negative acknowledgement (NACK) associated with the sidelink information, or a channel state information (CSI) report.

Any of the UEs above, further comprising means for receiving one or more CSI reference signals (CSI RSs), wherein the SCI includes a request for the CSI report associated with the one or more CSI RSs.

Any of the UEs above, wherein the SCI includes an offset value indicating a number of resources between sidelink resources allocated for the sidelink information and a portion of the one or more COT resources allocated for the SLFI, and a resource index indicating a position of the SLFI in the one or more COT resources.

Any of the UEs above, further comprising means for receiving at least one of an offset value indicating a number of resources between sidelink resources allocated for the sidelink information and a portion of the one or more COT resources allocated for the SLFI or a resource index indicating a position of the SLFI in the one or more COT resources, and wherein the SLFI includes one of the ACK or the NACK.

Any of the UEs above, further comprising means for identifying a COT region associated with the second transmitting UE based on the COT-SI, wherein the COT region includes the one or more COT resources, and means for receiving at least one of a relative offset value indicating a number of resources between a first resource in the COT region or a last resource in the COT region and the one or more COT resources.

Any of the UEs above, further comprising means for identifying a first zone identifier (ID) associated with the first transmitting UE, means for selecting the second transmitting UE based on a second zone ID of the second transmitting UE being identical to the first zone ID of the first transmitting UE, and wherein means for transmitting the feedback information comprises means for transmitting the SLFI after selecting the second transmitting UE for being in a same zone as the first transmitting UE.

Some aspects of the present disclosure include non-transitory computer readable media having instructions stored therein that, when executed by one or more processors of a user equipment (UE), cause the one or more processors to receive sidelink information from a first transmitting UE, receive channel occupancy time (COT) system information (COT-SI) associated with a second transmitting UE, identify one or more COT resources based on the COT-SI, and transmit feedback information associated with the sidelink information via the one or more COT resources.

Any of the non-transitory computer readable media above, wherein the instructions for identifying the one or more COT resources further comprises instructions for obtaining a transmitter identifier (ID) associated with the first transmitting UE and a group ID associated with the first transmitting UE, applying a hash function to at least one of the transmitter ID or the group ID to generate a result value, and identifying the one or more COT resources based on the result value.

Any of the non-transitory computer readable media above, wherein the instructions for transmitting the feedback information further comprises instructions for transmitting the feedback information via a physical sidelink feedback channel (PSFCH).

Any of the non-transitory computer readable media above, further comprising instructions, when executed by the one or more processors, cause the one or more processors to receive sidelink control information (SCI), and wherein the feedback information includes sidelink feedback information (SLFI) including at least one of an acknowledgement (ACK) associated with the sidelink information, a negative acknowledgement (NACK) associated with the sidelink information, or a channel state information (CSI) report.

Any of the non-transitory computer readable media above, further comprising instructions, when executed by the one or more processors, cause the one or more processors to receive one or more CSI reference signals (CSI RSs), wherein the SCI includes a request for the CSI report associated with the one or more CSI RSs.

Any of the non-transitory computer readable media above, wherein the SCI includes an offset value indicating a number of resources between sidelink resources allocated for the sidelink information and a portion of the one or more COT resources allocated for the SLFI, and a resource index indicating a position of the SLFI in the one or more COT resources.

Any of the non-transitory computer readable media above, further comprising instructions, when executed by the one or more processors, cause the one or more processors to receive at least one of an offset value indicating a number of resources between sidelink resources allocated for the sidelink information and a portion of the one or more COT resources allocated for the SLFI or a resource index indicating a position of the SLFI in the one or more COT resources, and wherein the SLFI includes one of the ACK or the NACK.

Any of the non-transitory computer readable media above, further comprising instructions, when executed by the one or more processors, cause the one or more processors to identify a COT region associated with the second transmitting UE based on the COT-SI, wherein the COT region includes the one or more COT resources, and receive at least one of a relative offset value indicating a number of resources between a first resource in the COT region or a last resource in the COT region and the one or more COT resources.

Any of the non-transitory computer readable media above, further comprising instructions, when executed by the one or more processors, cause the one or more processors to identify a first zone identifier (ID) associated with the first transmitting UE, select the second transmitting UE based on a second zone ID of the second transmitting UE being identical to the first zone ID of the first transmitting UE, and wherein transmitting the feedback information comprises transmitting the SLFI after selecting the second transmitting UE for being in a same zone as the first transmitting UE.

Aspects of the present disclosure include methods by a transmitting user equipment (UE) for transmitting sidelink information to a receiving UE, receiving channel occupancy time (COT) system information (COT-SI) associated with a neighbor transmitting UE, identifying one or more COT resources based on the COT-SI, and receiving feedback information associated with the sidelink information via the one or more COT resources.

The method above, wherein receiving the feedback information comprises receiving the feedback information via a physical sidelink feedback channel (PSFCH).

Any of the methods above, wherein transmitting the feedback information comprises transmitting the feedback information via a physical sidelink feedback channel (PSFCH).

Any of the methods above, further comprising transmitting sidelink control information (SCI) and wherein the feedback information includes sidelink feedback information (SLFI) including at least one of an acknowledgement (ACK) associated with the sidelink information, a negative acknowledgement (NACK) associated with the sidelink information, or a channel state information (CSI) report.

Any of the methods above, further comprising transmitting one or more CSI reference signals (CSI RSs), wherein the SCI includes a request for the CSI report associated with the one or more CSI RSs.

Any of the methods above, wherein the SCI includes an offset value indicating a number of resources between sidelink resources allocated for the sidelink information and a portion of the one or more COT resources allocated for the SLFI, and a resource index indicating a position of the SLFI in the one or more COT resources.

Any of the methods above, further comprising transmitting at least one of an offset value indicating a number of resources between sidelink resources allocated for the sidelink information and a portion of the one or more COT resources allocated for the SLFI or a resource index indicating a position of the SLFI in the one or more COT resources, and wherein the SLFI includes one of the ACK or the NACK.

Any of the methods above, further comprising identifying a COT region associated with the neighbor transmitting UE based on the COT-SI, wherein the COT region includes the one or more COT resources, and transmitting at least one of a relative offset value indicating a number of resources between a first resource in the COT region or a last resource in the COT region and the one or more COT resources.

Other aspects of the present disclosure include a transmitting user equipment (UE) having a memory comprising instructions, a transceiver, and one or more processors operatively coupled with the memory and the transceiver, the one or more processors configured to execute instructions in the memory to transmit sidelink information to a receiving UE, receive channel occupancy time (COT) system information (COT-SI) associated with a neighbor transmitting UE, identify one or more COT resources based on the COT-SI, and receive feedback information associated with the sidelink information via the one or more COT resources.

The UE above, wherein receiving the feedback information comprises receiving the feedback information via a physical sidelink feedback channel (PSFCH).

Any of the UEs above, wherein transmitting the feedback information comprises transmitting the feedback information via a physical sidelink feedback channel (PSFCH).

Any of the UEs above, wherein the one or more processors are further configured to execute instructions in the memory to transmit sidelink control information (SCI) and wherein the feedback information includes sidelink feedback information (SLFI) including at least one of an acknowledgement (ACK) associated with the sidelink information, a negative acknowledgement (NACK) associated with the sidelink information, or a channel state information (CSI) report.

Any of the UEs above, wherein the one or more processors are further configured to execute instructions in the memory to transmit one or more CSI reference signals (CSI RSs), wherein the SCI includes a request for the CSI report associated with the one or more CSI RSs.

Any of the UEs above, wherein the SCI includes an offset value indicating a number of resources between sidelink resources allocated for the sidelink information and a portion of the one or more COT resources allocated for the SLFI, and a resource index indicating a position of the SLFI in the one or more COT resources.

Any of the UEs above, wherein the one or more processors are further configured to execute instructions in the memory to transmit at least one of an offset value indicating a number of resources between sidelink resources allocated for the sidelink information and a portion of the one or more COT resources allocated for the SLFI or a resource index indicating a position of the SLFI in the one or more COT resources, and wherein the SLFI includes one of the ACK or the NACK.

Any of the UEs above, wherein the one or more processors are further configured to execute instructions in the memory to identify a COT region associated with the neighbor transmitting UE based on the COT-SI, wherein the COT region includes the one or more COT resources, and transmit at least one of a relative offset value indicating a number of resources between a first resource in the COT region or a last resource in the COT region and the one or more COT resources.

An aspect of the present disclosure includes a transmitting user equipment (UE) including means for transmitting sidelink information to a receiving UE, means for receiving channel occupancy time (COT) system information (COT-SI) associated with a neighbor transmitting UE, means for identifying one or more COT resources based on the COT-SI, and receiving feedback information associated with the sidelink information via the one or more COT resources.

The UE above, wherein means for receiving the feedback information comprises means for receiving the feedback information via a physical sidelink feedback channel (PSFCH).

Any of the UEs above, wherein means for transmitting the feedback information comprises means for transmitting the feedback information via a physical sidelink feedback channel (PSFCH).

Any of the UEs above, further comprising means for transmitting sidelink control information (SCI) and wherein the feedback information includes sidelink feedback information (SLFI) including at least one of an acknowledgement (ACK) associated with the sidelink information, a negative acknowledgement (NACK) associated with the sidelink information, or a channel state information (CSI) report.

Any of the UEs above, further comprising means for transmitting one or more CSI reference signals (CSI RSs), wherein the SCI includes a request for the CSI report associated with the one or more CSI RSs.

Any of the UEs above, wherein the SCI includes an offset value indicating a number of resources between sidelink resources allocated for the sidelink information and a portion of the one or more COT resources allocated for the SLFI, and a resource index indicating a position of the SLFI in the one or more COT resources.

Any of the UEs above, further comprising means for transmitting at least one of an offset value indicating a number of resources between sidelink resources allocated for the sidelink information and a portion of the one or more COT resources allocated for the SLFI or a resource index indicating a position of the SLFI in the one or more COT resources, and wherein the SLFI includes one of the ACK or the NACK.

Any of the UEs above, further comprising means for identifying a COT region associated with the neighbor transmitting UE based on the COT-SI, wherein the COT region includes the one or more COT resources, and means for transmitting at least one of a relative offset value indicating a number of resources between a first resource in the COT region or a last resource in the COT region and the one or more COT resources.

Some aspects of the present disclosure include a non-transitory computer readable medium having instructions stored therein that, when executed by one or more processors of a transmitting user equipment (UE), cause the one or more processors to transmit sidelink information to a receiving UE, receive channel occupancy time (COT) system information (COT-SI) associated with a neighbor transmitting UE, identify one or more COT resources based on the COT-SI, and receive feedback information associated with the sidelink information via the one or more COT resources.

The non-transitory computer readable medium above, wherein the instructions for receiving the feedback information comprises instructions for receiving the feedback information via a physical sidelink feedback channel (PSFCH).

Any of the non-transitory computer readable media above, wherein instructions for transmitting the feedback information comprises instructions for transmitting the feedback information via a physical sidelink feedback channel (PSFCH).

Any of the non-transitory computer readable media above, further comprising instructions that cause the one or more processors to transmit sidelink control information (SCI) and wherein the feedback information includes sidelink feedback information (SLFI) including at least one of an acknowledgement (ACK) associated with the sidelink information, a negative acknowledgement (NACK) associated with the sidelink information, or a channel state information (CSI) report.

Any of the non-transitory computer readable media above, further comprising instructions that cause the one or more processors to transmit one or more CSI reference signals (CSI RSs), wherein the SCI includes a request for the CSI report associated with the one or more CSI RSs.

Any of the non-transitory computer readable media above, wherein the SCI includes an offset value indicating a number of resources between sidelink resources allocated for the sidelink information and a portion of the one or more COT resources allocated for the SLFI, and a resource index indicating a position of the SLFI in the one or more COT resources.

Any of the non-transitory computer readable media above, further comprising instructions that cause the one or more processors to transmit at least one of an offset value indicating a number of resources between sidelink resources allocated for the sidelink information and a portion of the one or more COT resources allocated for the SLFI or a resource index indicating a position of the SLFI in the one or more COT resources, and wherein the SLFI includes one of the ACK or the NACK.

Any of the non-transitory computer readable media above, further comprising instructions that cause the one or more processors to identify a COT region associated with the neighbor transmitting UE based on the COT-SI, wherein the COT region includes the one or more COT resources, and transmit at least one of a relative offset value indicating a number of resources between a first resource in the COT region or a last resource in the COT region and the one or more COT resources.

Aspects of the present disclosure include methods by a transmitting user equipment (UE) for transmitting sidelink information to a first UE, obtaining a plurality of resources for a COT region, and transmitting COT system information (COT-SI) identifying one or more COT resources of the plurality of resources to at least a second UE for transmitting feedback information, wherein the feedback information is associated with sidelink information the second UE received from a transmitting UE different than the COT sharing UE.

The method above, wherein receiving the feedback information comprises receiving the feedback information via a physical sidelink feedback channel (PSFCH).

Any of the methods above, further comprising obtaining a transmitter identifier (ID) associated with the transmitting UE and a group ID associated with the first transmitting UE, applying a hash function to at least one of the transmitter ID or the group ID to generate a result value, and identifying the one or more COT resources based on the result value.

Any of the methods above, further comprising transmitting allocating the one or more COT resources to the second UE for transmitting the feedback information.

Any of the methods above, further comprising receiving a request for a set of COT resources of the plurality of COT resources from the first UE, wherein at least a portion of the set of COT resources overlaps with at least a portion of the one or more COT resources and allocating the set of COT resources to the first UE.

Other aspects of the present disclosure include a transmitting user equipment (UE) having a memory comprising instructions, a transceiver, and one or more processors operatively coupled with the memory and the transceiver, the one or more processors configured to execute instructions in the memory to transmit sidelink information to a first UE, obtain a plurality of resources for a COT region, and transmit COT system information (COT-SI) identifying one or more COT resources of the plurality of resources to at least a second UE for transmitting feedback information, wherein the feedback information is associated with sidelink information the second UE received from a transmitting UE different than the COT sharing UE.

The UE above, wherein receiving the feedback information comprises receiving the feedback information via a physical sidelink feedback channel (PSFCH).

Any of the UEs above, wherein the one or more processors are further configured to obtain a transmitter identifier (ID) associated with the transmitting UE and a group ID associated with the first transmitting UE, apply a hash function to at least one of the transmitter ID or the group ID to generate a result value, and identify the one or more COT resources based on the result value.

Any of the UEs above, wherein the one or more processors are further configured to transmit allocating the one or more COT resources to the second UE for transmitting the feedback information.

Any of the UEs above, wherein the one or more processors are further configured to receive a request for a set of COT resources of the plurality of COT resources from the first UE, wherein at least a portion of the set of COT resources overlaps with at least a portion of the one or more COT resources and allocating the set of COT resources to the first UE.

An aspect of the present disclosure includes a transmitting user equipment (UE) including means for transmitting sidelink information to a first UE, means for obtaining a plurality of resources for a COT region, and means for transmitting COT system information (COT-SI) identifying one or more COT resources of the plurality of resources to at least a second UE for transmitting feedback information, wherein the feedback information is associated with sidelink information the second UE received from a transmitting UE different than the COT sharing UE.

The UE above, wherein means for receiving the feedback information comprises means for receiving the feedback information via a physical sidelink feedback channel (PSFCH).

Any of the UEs above, further comprising means for obtaining a transmitter identifier (ID) associated with the transmitting UE and a group ID associated with the first transmitting UE, means for applying a hash function to at least one of the transmitter ID or the group ID to generate a result value, and means for identifying the one or more COT resources based on the result value.

Any of the UEs above, further comprising means for transmitting allocating the one or more COT resources to the second UE for transmitting the feedback information.

Any of the UEs above, further comprising means for receiving a request for a set of COT resources of the plurality of COT resources from the first UE, wherein at least a portion of the set of COT resources overlaps with at least a portion of the one or more COT resources and allocating the set of COT resources to the first UE.

Some aspects of the present disclosure include non-transitory computer readable media having instructions stored therein that, when executed by one or more processors of a transmitting user equipment (UE), cause the one or more processors to transmit sidelink information to a first UE, obtain a plurality of resources for a COT region, and transmit COT system information (COT-SI) identifying one or more COT resources of the plurality of resources to at least a second UE for transmitting feedback information, wherein the feedback information is associated with sidelink information the second UE received from a transmitting UE different than the COT sharing UE.

The non-transitory computer readable medium above, wherein the instructions for receiving the feedback information comprises instructions for receiving the feedback information via a physical sidelink feedback channel (PSFCH).

Any of the non-transitory computer readable media above, further comprising instructions for obtaining a transmitter identifier (ID) associated with the transmitting UE and a group ID associated with the first transmitting UE, applying a hash function to at least one of the transmitter ID or the group ID to generate a result value, and identifying the one or more COT resources based on the result value.

Any of the non-transitory computer readable media above, further comprising instructions for transmitting allocating the one or more COT resources to the second UE for transmitting the feedback information.

Any of the non-transitory computer readable media above, further comprising instructions for receiving a request for a set of COT resources of the plurality of COT resources from the first UE, wherein at least a portion of the set of COT resources overlaps with at least a portion of the one or more COT resources and allocating the set of COT resources to the first UE.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a receiving user equipment (UE) in a network, comprising:
    receiving sidelink information from a first transmitting UE;
    receiving sidelink control information (SCI);
    receiving channel occupancy time (COT) system information (COT-SI) from a second transmitting UE, the COT-SI indicating one or more COT resources allocated by a base station in response to a request by the second transmitting UE;
    identifying a COT region associated with the second transmitting UE based on the COT-SI, wherein the COT region includes the one or more COT resources;
    receiving at least one of a relative offset value indicating a number of resources between a first resource in the COT region or a last resource in the COT region and the one or more COT resources;
    identifying the one or more COT resources based on the COT-SI; and
    transmitting feedback information associated with the sidelink information via the one or more COT resources, wherein the feedback information includes sidelink feedback information (SLFI) including at least one of an acknowledgement (ACK) associated with the sidelink information, a negative acknowledgement (NACK) associated with the sidelink information, or a channel state information (CSI) report.

2. The method of claim 1, wherein identifying the one or more COT resources comprises:
    obtaining a transmitter identifier (ID) associated with the first transmitting UE and a group ID associated with the first transmitting UE;
    applying a hash function to at least one of the transmitter ID or the group ID to generate a result value; and
    identifying the one or more COT resources based on the result value.

3. The method of claim 1, wherein transmitting the feedback information comprises:
    transmitting the feedback information via a physical sidelink feedback channel (PSFCH).

4. The method of claim 1, further comprising:
    receiving one or more CSI reference signals (CSI RSs), wherein the SCI includes a request for the CSI report associated with the one or more CSI RSs.

5. The method of claim 4, wherein the SCI includes:
    an offset value indicating a number of resources between sidelink resources allocated for the sidelink information and a portion of the one or more COT resources allocated for the SLFI;
    and a resource index indicating a position of the SLFI in the one or more COT resources.

6. The method of claim 1, further comprising:
    receiving at least one of an offset value indicating a number of resources between sidelink resources allocated for the sidelink information and a portion of the one or more COT resources allocated for the SLFI or a resource index indicating a position of the SLFI in the one or more COT resources; and
    wherein the SLFI includes one of the ACK or the NACK.

7. The method of claim 1, further comprising:
identifying a first zone identifier (ID) associated with the first transmitting UE;
selecting the second transmitting UE based on a second zone ID of the second transmitting UE being identical to the first zone ID of the first transmitting UE; and
wherein transmitting the feedback information comprises transmitting the SLFI after selecting the second transmitting UE for being in a same zone as the first transmitting UE.

8. A receiving user equipment (UE), comprising:
memory comprising instructions;
a transceiver; and
one or more processors operatively coupled with the memory and the transceiver, the one or more processors configured to execute instructions to:
receive sidelink information from a first transmitting UE;
receive sidelink control information (SCI);
receive channel occupancy time (COT) system information (COT-SI) from a second transmitting UE, the COT-SI indicating one or more COT resources allocated by a base station in response to a request by the second transmitting UE;
identify a COT region associated with the second transmitting UE based on the COT-SI, wherein the COT region includes the one or more COT resources;
receive at least one of a relative offset value indicating a number of resources between a first resource in the COT region or a last resource in the COT region and the one or more COT resources;
identify the one or more COT resources based on the COT-SI; and
transmit feedback information associated with the sidelink information via the one or more COT resources, wherein the feedback information includes sidelink feedback information (SLFI) including at least one of an acknowledgement (ACK) associated with the sidelink information, a negative acknowledgement (NACK) associated with the sidelink information, or a channel state information (CSI) report.

9. The UE of claim 8, wherein identifying the one or more COT resources comprises:
obtaining a transmitter identifier (ID) associated with the first transmitting UE and a group ID associated with the first transmitting UE;
applying a hash function to at least one of the transmitter ID or the group ID to generate a result value; and
identifying the one or more COT resources based on the result value.

10. The UE of claim 8, wherein transmitting the feedback information comprises:
transmitting the feedback information via a physical sidelink feedback channel (PSFCH).

11. The UE of claim 8, wherein the one or more processors are further configured to:
receive one or more CSI reference signals (CSI RSs), wherein the SCI includes a request for the CSI report associated with the one or more CSI RSs.

12. The UE of claim 11, wherein the SCI includes:
an offset value indicating a number of resources between sidelink resources allocated for the sidelink information and a portion of the one or more COT resources allocated for the SLFI;
and a resource index indicating a position of the SLFI in the one or more COT resources.

13. The UE of claim 8, wherein the one or more processors are further configured to:
receive at least one of an offset value indicating a number of resources between sidelink resources allocated for the sidelink information and a portion of the one or more COT resources allocated for the SLFI or a resource index indicating a position of the SLFI in the one or more COT resources; and
wherein the SLFI includes one of the ACK or the NACK.

14. The UE of claim 8, wherein the one or more processors are further configured to:
identify a first zone identifier (ID) associated with the first transmitting UE;
select the second transmitting UE based on a second zone ID of the second transmitting UE being identical to the first zone ID of the first transmitting UE; and
wherein transmitting the feedback information comprises transmitting the SLFI after selecting the second transmitting UE for being in a same zone as the first transmitting UE.

15. A non-transitory computer readable medium having instructions stored therein that, when executed by one or more processors of a receiving user equipment (UE), cause the one or more processors to:
receive sidelink information from a first transmitting UE;
receive sidelink control information (SCI);
receive channel occupancy time (COT) system information (COT-SI) from a second transmitting UE, the COT-SI indicating one or more COT resources allocated by a base station in response to a request by the second transmitting UE;
identify a COT region associated with the second transmitting UE based on the COT-SI, wherein the COT region includes the one or more COT resources;
receive at least one of a relative offset value indicating a number of resources between a first resource in the COT region or a last resource in the COT region and the one or more COT resources;
identify the one or more COT resources based on the COT-SI; and
transmit feedback information associated with the sidelink information via the one or more COT resources, wherein the feedback information includes sidelink feedback information (SLFI) including at least one of an acknowledgement (ACK) associated with the sidelink information, a negative acknowledgement (NACK) associated with the sidelink information, or a channel state information (CSI) report.

16. The non-transitory computer readable medium of claim 15, wherein the instructions for identifying the one or more COT resources further comprises instructions for:
obtaining a transmitter identifier (ID) associated with the first transmitting UE and a group ID associated with the first transmitting UE;
applying a hash function to at least one of the transmitter ID or the group ID to generate a result value; and
identifying the one or more COT resources based on the result value.

17. The non-transitory computer readable medium of claim 15, wherein the instructions for transmitting the feedback information further comprises instructions for:
transmitting the feedback information via a physical sidelink feedback channel (PSFCH).

18. The non-transitory computer readable medium of claim 15, further comprising instructions, when executed by the one or more processors, cause the one or more processors to:

receive one or more CSI reference signals (CSI RSs), wherein the SCI includes a request for the CSI report associated with the one or more CSI RSs.

19. The non-transitory computer readable medium of claim 18, wherein the SCI includes:
an offset value indicating a number of resources between sidelink resources allocated for the sidelink information and a portion of the one or more COT resources allocated for the SLFI;
and a resource index indicating a position of the SLFI in the one or more COT resources.

20. The non-transitory computer readable medium of claim 15, further comprising instructions, when executed by the one or more processors, cause the one or more processors to:
receive at least one of an offset value indicating a number of resources between sidelink resources allocated for the sidelink information and a portion of the one or more COT resources
allocated for the SLFI or a resource index indicating a position of the SLFI in the one or more COT resources; and wherein the SLFI includes one of the ACK or the NACK.

21. The non-transitory computer readable medium of claim 15, further comprising instructions, when executed by the one or more processors, cause the one or more processors to:
identify a first zone identifier (ID) associated with the first transmitting UE;
select the second transmitting UE based on a second zone ID of the second transmitting UE being identical to the first zone ID of the first transmitting UE; and
wherein transmitting the feedback information comprises transmitting the SLFI after selecting the second transmitting UE for being in a same zone as the first transmitting UE.

22. A receiving user equipment (UE), comprising:
means for receiving sidelink information from a first transmitting UE;
means for receiving sidelink control information (SCI);
means for receiving channel occupancy time (COT) system information (COT-SI) from a second transmitting UE, the COT-SI indicating one or more COT resources allocated by a base station in response to a request by the second transmitting UE;
means for identifying a COT region associated with the second transmitting UE based on the COT-SI, wherein the COT region includes the one or more COT resources;
means for receiving at least one of a relative offset value indicating a number of resources between a first resource in the COT region or a last resource in the COT region and the one or more COT resources;
means for identifying the one or more COT resources based on the COT-SI; and
means for transmitting feedback information associated with the sidelink information via the one or more COT resources, wherein the feedback information includes sidelink feedback information (SLFI) including at least one of an acknowledgement (ACK) associated with the sidelink information, a negative acknowledgement (NACK) associated with the sidelink information, or a channel state information (CSI) report.

23. The UE of claim 22, wherein means for identifying the one or more COT resources comprises:
means for obtaining a transmitter identifier (ID) associated with the first transmitting UE and a group ID associated with the first transmitting UE;
means for applying a hash function to at least one of the transmitter ID or the group ID to generate a result value; and
means for identifying the one or more COT resources based on the result value.

24. The UE of claim 22, wherein means for transmitting the feedback information comprises:
means for transmitting the feedback information via a physical sidelink feedback channel (PSFCH).

* * * * *